(12) United States Patent
Tokuchi

(10) Patent No.: US 11,048,405 B2
(45) Date of Patent: Jun. 29, 2021

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 16/120,673

(22) Filed: Sep. 4, 2018

(65) Prior Publication Data

US 2019/0243532 A1    Aug. 8, 2019

(30) Foreign Application Priority Data

Feb. 2, 2018   (JP) .............................. JP2018-017690

(51) Int. Cl.
| | |
|---|---|
| *G06F 3/0488* | (2013.01) |
| *G06F 3/0484* | (2013.01) |
| *G06F 40/20* | (2020.01) |
| *G06F 40/30* | (2020.01) |

(52) U.S. Cl.
CPC ........ *G06F 3/0488* (2013.01); *G06F 3/04845* (2013.01); *G06F 3/04847* (2013.01); *G06F 3/04883* (2013.01); *G06F 40/20* (2020.01); *G06F 40/30* (2020.01); *G06F 2203/04803* (2013.01)

(58) Field of Classification Search
None
See application file for complete search history.

(56) References Cited

U.S. PATENT DOCUMENTS

| | | | |
|---|---|---|---|
| 9,747,927 B2 | 8/2017 | Nakano et al. | |
| 9,983,760 B2 | 5/2018 | Min | |
| 2009/0119584 A1* | 5/2009 | Herbst | G06F 16/367 715/273 |
| 2010/0293501 A1* | 11/2010 | Russ | G06F 3/04886 715/803 |
| 2011/0246562 A1* | 10/2011 | Kang | G06F 40/30 709/203 |
| 2013/0086458 A1 | 4/2013 | Kurata et al. | |
| 2015/0134573 A1* | 5/2015 | Donatelli | G06N 5/02 706/11 |
| 2017/0357437 A1* | 12/2017 | Peterson | G06F 3/0486 |

FOREIGN PATENT DOCUMENTS

| | | | |
|---|---|---|---|
| JP | 2011-066546 | A | 3/2011 |
| JP | 2013-077982 | A | 4/2013 |
| JP | 2014-106968 | A | 6/2014 |
| JP | 6150237 | B2 | 6/2017 |

* cited by examiner

*Primary Examiner* — Abdullah Al Kawsar
*Assistant Examiner* — David V Luu
(74) *Attorney, Agent, or Firm* — Oliff PLC

(57) ABSTRACT

An information processing device includes: a receiving interface that receives a layout of at least one figure based on an instruction of a user, the at least one figure representing a meaning of at least part of target data based on a meaning obtained from the target data; and a display controller that displays the at least one figure on a display according to the layout received by the receiving interface.

13 Claims, 19 Drawing Sheets

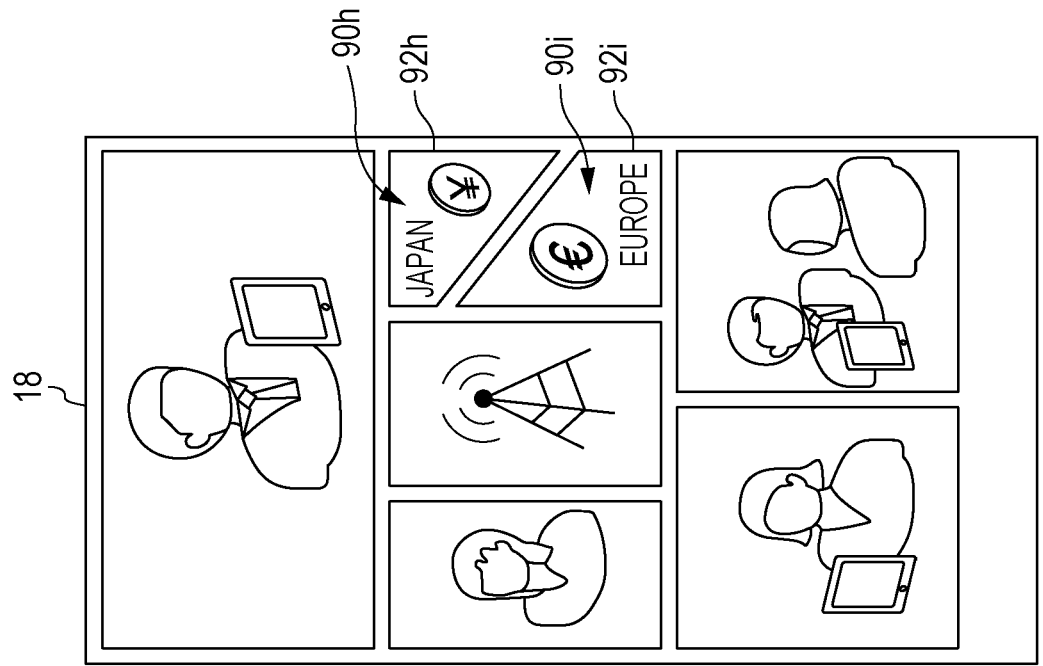
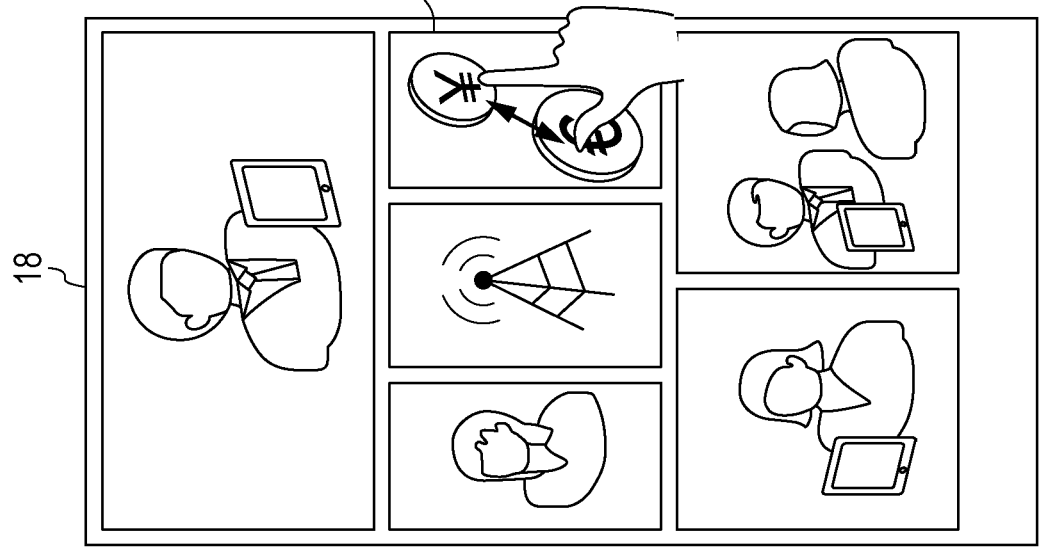

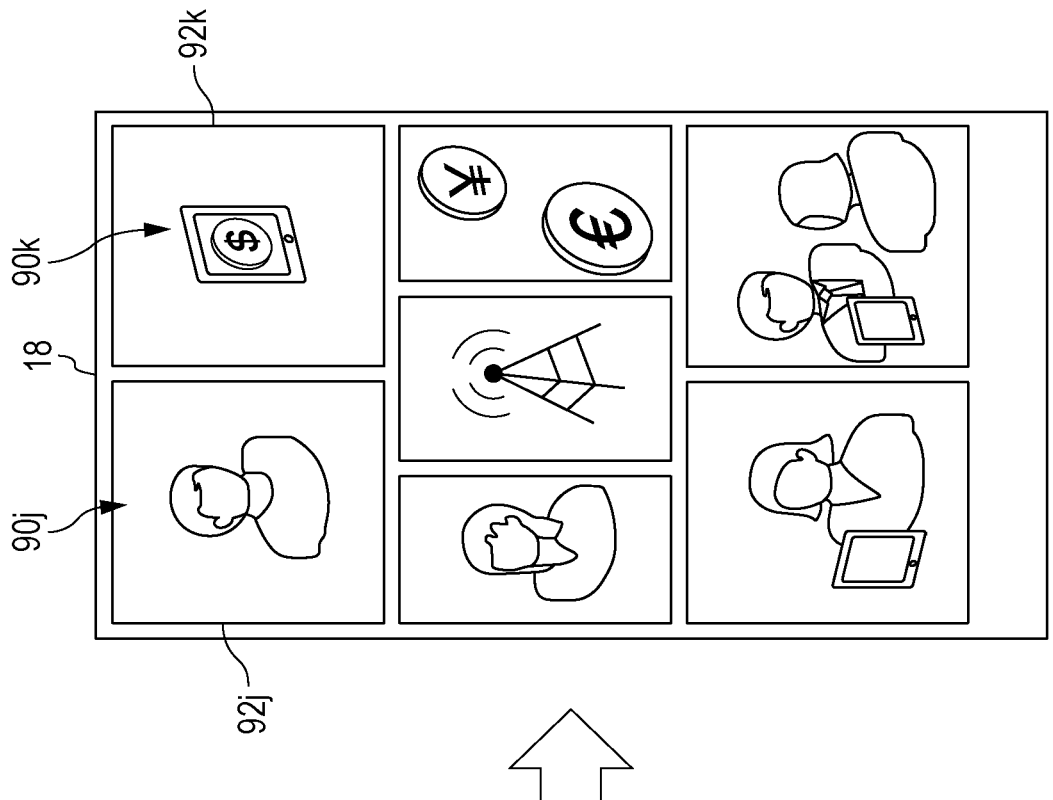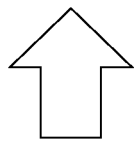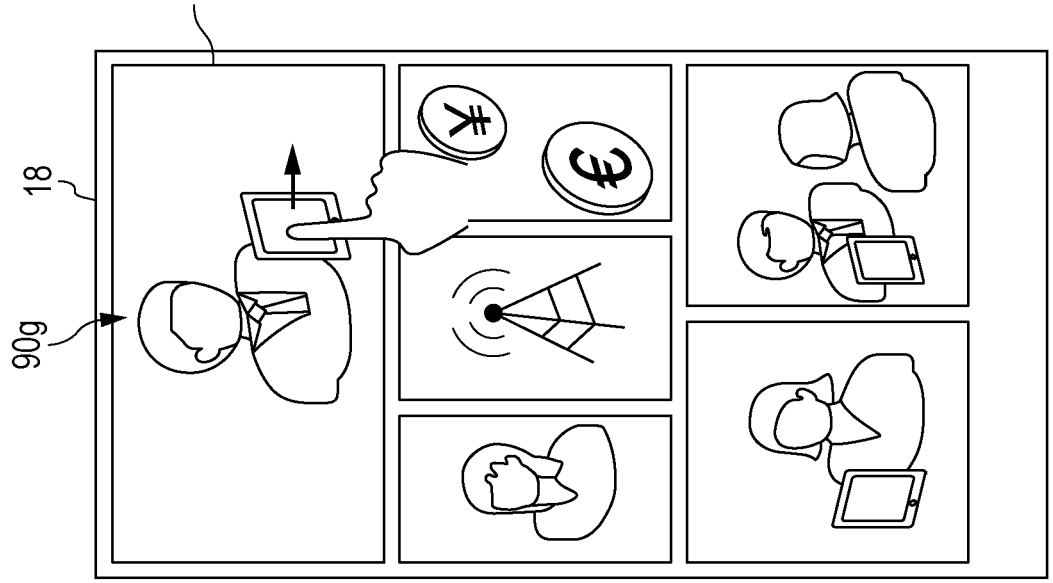

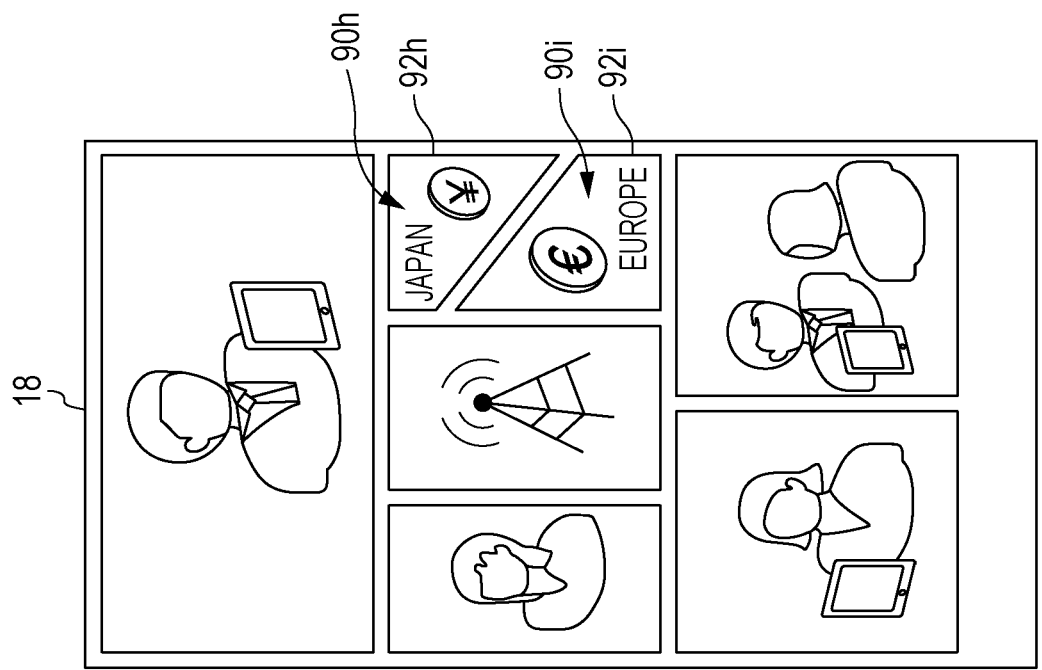
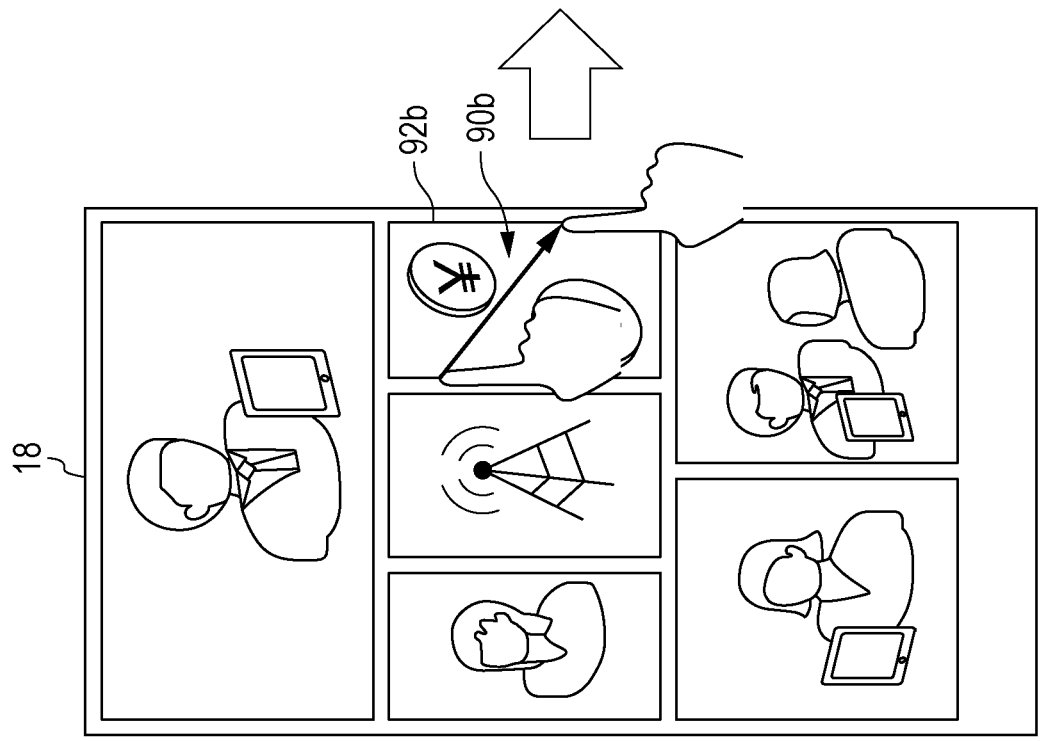

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-017690 filed on Feb. 2, 2018.

BACKGROUND

Technical Field

The present invention relates to an information processing device and a non-transitory computer readable medium.

SUMMARY

According to an aspect of the invention, there is provided an information processing device including: a receiving interface that receives a layout of at least one figure based on an instruction of a user, the at least one figure representing a meaning of at least part of target data based on a meaning obtained from the target data; and a display controller that displays the at least one figure on a display according to the layout received by the receiving interface.

BRIEF DESCRIPTION OF THE DRAWINGS

Exemplary embodiments of the present invention will be described in detail based on the following figures, wherein:

FIGS. 20A and 20B are views illustrating the manner in which a frame is divided by a pinch-out operation;

FIGS. 21A and 21B are views illustrating the manner in which a frame is divided by a sliding operation; and FIGS. 22A and 22B provide a second figure illustrating the manner in which a frame is divided by a sliding operation.

DETAILED DESCRIPTION

First Exemplary Embodiment

Figure 1:
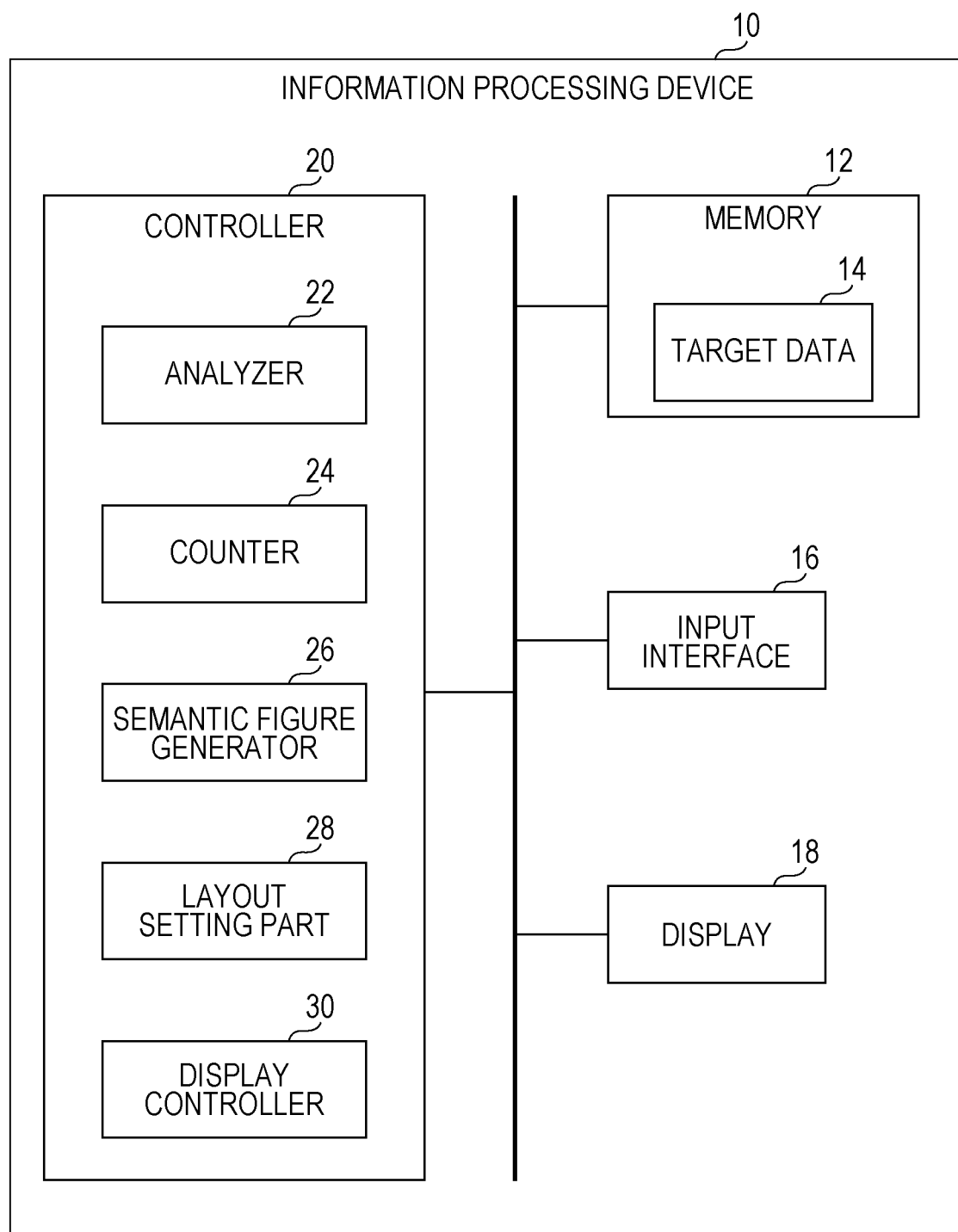
FIG. 1 is a schematic configuration diagram of an information processing device according to this exemplary embodiment.

FIG. 1 is a schematic configuration diagram of an information processing device 10 according to a first exemplary embodiment. Although examples of the information processing device 10 include a mobile terminal such as a personal computer and a smartphone, or a server, the information processing device 10 may be any device as long as the device can implement the following functions.

The memory 12 is configured to include, for instance, a ROM, a RAM, or a hard disk. The memory 12 stores information processing programs for operating the components of the information processing device 10. Furthermore, as illustrated in FIG. 1, target data 14 is stored in the memory 12.

The target data 14 is data to be processed by the information processing device 10, and includes a document such as a web page or an electronic document, dynamic image data, and voice data. The target data 14 may be obtained from a device other than the information processing device 10 via a communicator (not illustrated), or may be generated by the information processing device 10.

An input interface 16 is configured to include, for instance, a touch panel, a keyboard, a voice input, and/or a mouse. Also, the input interface 16 may be is configurated to include an interface that receives a non-contact operation (gesture) utilizing voice, a camera, or a sensor. The input interface 16 is used to input an instruction of a user of the information processing device 10.

The display 18 is configured to include, for instance, a liquid crystal panel. On the display 18, various screens are displayed, and particularly, a result of processing by the later-described controller 20 is displayed.

It is to be noted that when the information processing device 10 is a server, the information processing device 10 may not include the input interface 16 and the display 18. In this case, a touch panel, a keyboard, and a mouse of a user terminal utilized by a user who has gained access to the server correspond to the input interface 16, and a liquid crystal panel or the like of the user terminal corresponds to the display 18.

The controller 20 is configured to include, for instance, a CPU or a micro controller. The controller 20 controls the components of the information processing device 10 in accordance with an information processing program stored in the memory 12. As illustrated in FIG. 1, the controller 20 also functions as an analyzer 22, a counter 24, a semantic figure generator 26, a layout setting part 28, and a display controller 30.

The analyzer 22 obtains the meaning (contents) of the target data 14 by analyzing the target data 14. Specifically, the analyzer 22 obtains the meaning of the target data 14 by performing natural language processing on a character string extracted from the target data 14.

Regarding the extraction of a character string from the target data 14, when the target data 14 is an electronic document, a character string can be extracted, for instance, by performing character recognition processing on the electronic document. When the target data 14 is dynamic image data or voice data, a character string can be extracted by converting the voice included in the dynamic image data or the voice data into text data.

The natural language processing is processing including morphological analysis, syntax analysis, semantic analysis, and context analysis.

The morphological analysis is processing that divides a character string into multiple morphemes (each of which is a minimum unit having a meaning in a language) in a sequence based on a grammar of a target language and information, such as word classes of single words, called a dictionary, and determines the word class of each of the morphemes.

The syntax analysis is processing that identifies a syntactical relationship such as a relationship between the multiple morphemes (for instance, a relationship between a modifier and a modifiee), and determines a positional relationship (such as a modification relationship) between the multiple morphemes. Multiple patterns of syntax tree (a tree structure having the morphemes as nodes) are formed by the syntax analysis.

The semantic analysis is processing that considers the meaning of each of the morphemes, and determines a correct connection between the multiple morphemes based on the meaning of each morpheme. A semantically correct syntax tree is selected from the multiple patterns of syntax tree by the semantic analysis.

The context analysis is processing that performs the syntax analysis and the semantic analysis on a sentence made up of one or more morphemes. For instance, the contents of each demonstrative pronoun appears in a second sentence are grasped based on the contents of a first sentence by the context analysis.

The analyzer 22 may identify particularly one or more priority parts of the target data 14 by performing natural language processing on the target data 14. In particular, the analyzer 22 may identify not only a character string which explicitly appears in the target data 14, but also contents including contents estimated from the contents of the character string, as a priority part.

Also, the analyzer 22 may analyze the meaning of the entire target data 14, and may generate a summary character string that indicates an entire summary of the target data 14. The summary is the meaning (contents) which is particularly desired to be represented by the target data 14, and may overlap with the priority part of the target data 14. However, the summary character string may not be part of the character string extracted from the target data 14.

Alternatively, the analyzer 22 may divide the target data 14 into multiple categories based on the meaning of the target data 14. For instance, the target data 14 may be divided into four categories: the purpose, the problem, the solution, and the homework by the next time.

Alternatively, the analyzer 22 may identify a priority part for each of the categories. Furthermore, the analyzer 22 may generate a summary character string for each of the categories.

It is to be noted that how the target data 14 is divided may be set by a user.

The counter 24 counts the number of times of appearance of each of multiple terms which appear in the target data 14. Here, the "term" is a concept that includes a single word which is a minimum constituent unit in a sentence, and a string or a phrase containing multiple single words.

The semantic figure generator 26 generates a semantic figure that represents the meaning of at least part of the target data 14, based on the meaning of the target data 14 obtained by the analyzer 22. Examples of a semantic figure includes a figure that allows a user to understand a relationship between the terms included in part of the target data 14 based on which a semantic figure is generated, for instance, a relationship between the subject (who), the predicate (does), and the object (what). Each semantic figure includes one or more components. The components are a graphic, a photograph, or a character. For instance, a semantic figure is configured to combine a component indicating the subject, a component indicating the predicate, and a component indicating the object. The details of the semantic figure will be described later.

The semantic figure generator 26 generates a semantic figure that represents, for instance, the meaning of a priority part, which is determined to have priority, of the target data 14. The determination of a priority part is made, for instance, based on a result of analysis by the analyzer 22 or a result of count by the counter 24. Alternatively, the semantic figure generator 26 may generate a semantic figure that represents a summary character string generated by the analyzer 22.

Alternatively, the semantic figure generator 26 may generate multiple semantic figures that represent the meaning of multiple parts of the target data 14.

The layout setting part 28 sets a (display) layout for a semantic figure generated by the semantic figure generator 26. The layout is a concept that includes, for instance, a position the display 18, at which a semantic figure is displayed, and a size of the semantic figure. The layout setting part 28 sets a layout for a semantic figure based on an instruction from a user.

The display controller 30 performs processing for displaying various screens on the display 18. The display controller 30 displays, particularly a semantic figure generated by the semantic figure generator 26 on the display 18.

Hereinafter, the processing performed by the semantic figure generator 26 and the display controller 30 in the first exemplary embodiment will be described in detail.

Figure 2:
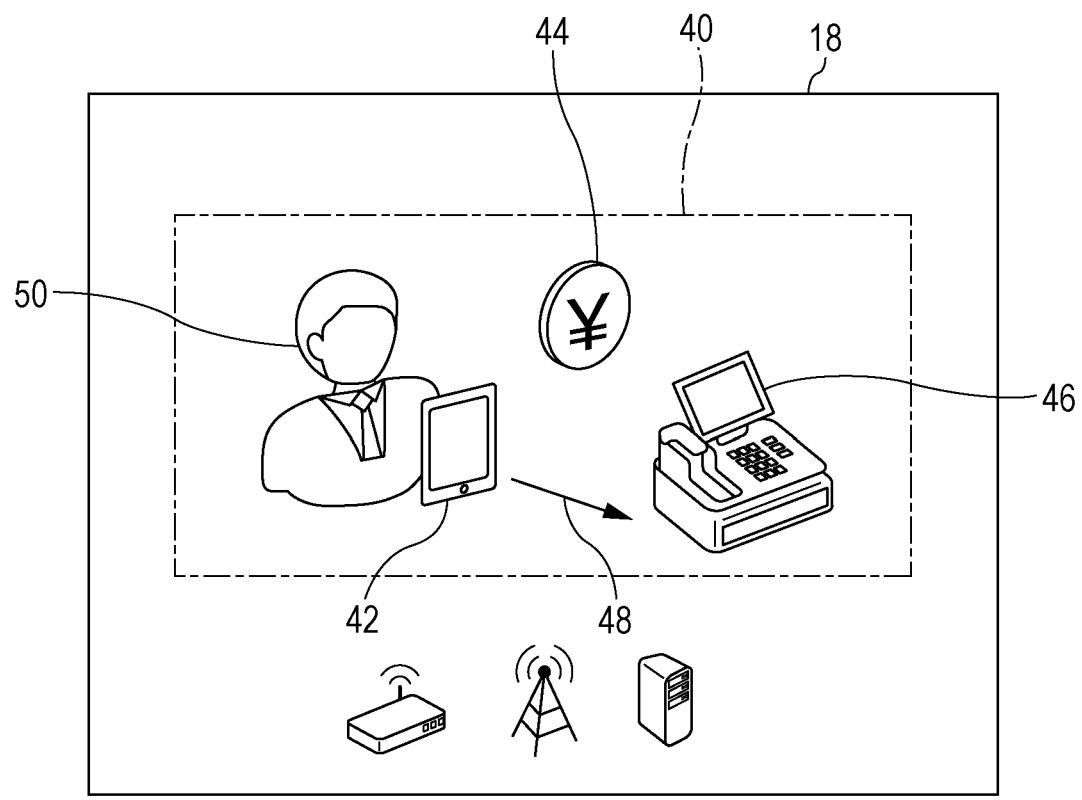
FIG. 2 is a view illustrating a first display example of a semantic figure.

FIG. 2 illustrates a display example of a semantic figure 40 generated by the semantic figure generator 26. In FIG. 2, a partial character string, that is, "makes electronic payment with a smartphone, at a convenience store, at 17:00" is determined to be a priority part of a character string extracted from the target data 14, and the semantic figure 40 representing the priority part is illustrated.

As described above, the semantic figure 40 includes multiple components 42 to 50. The above-mentioned priority part is represented by these multiple components 42 to 50. For instance, the component 42 is a graphic that directly indicates a "smartphone". In addition, the component 44 is a graphic that indicates money, the component 46 is a graphic that indicates a cash register, and "electronic payment" is represented by the component 44 and the component 46. In order to illustrate electronic payment by a smartphone in a more understandable manner, the semantic figure 40 includes the component 48 that is an arrow graphic pointing from the component 42 (smartphone) to the component 46 (cash register).

The semantic figure 40 may include a component that represents a term not contained in a partial character string ("makes electronic payment with a smartphone, at a convenience store, at 17:00" in the example), based on which the semantic figure 40 is generated, among a character string extracted from the target data 14. In the example of FIG. 2, the component 50 representing a "male" which is a term not contained in the partial character string is included in the semantic figure 40. It is represented by the component 50 that electronic payment is made by a male.

In the partial character string based on which the semantic figure 40 is generated, it is not explicitly represented that electronic payment is made by a male. However, in natural language processing performed on character strings including a character string other than the partial character string, it may be determined that electronic payment is made by a male. In such a case, in order to illustrate that electronic payment is made by a male in an understandable manner, the semantic figure generator 26 generates a semantic figure 40 including the component 50 representing a male.

Also, as described above, a component included in the semantic figure 40 is not limited to a graphic, but may be a photograph or a character. For instance, in the example of FIG. 2, the component 42 is represented, in which a smartphone is a graphic. However, when a specific model of smartphone is desired to be represented, for instance, the specific model of smartphone has a priority in the target data 14, the semantic figure generator 26 may include a photograph of the specific model of smartphone in the semantic figure 40 instead of the component 42.

Alternatively, the semantic figure 40 may include a component which is a character. For instance, a semantic figure 40' illustrated in FIG. 3 includes a component 52 which is the character of "convenience store" as a term contained in a partial character string based on which the semantic figure 40' is generated, as well as a component 54 which is the character of "17:00" as a term contained in the partial character string. Also here, the semantic figure 40' may include a component of a character indicating a term not contained in the partial character string.

Alternatively, the display controller 30 may determine a display mode of a component included in the semantic figure 40 based on a level of priority of the term represented by the component in the target data 14. For instance, in the semantic figure 40' illustrating in FIG. 3, when the "convenience store" is determined to have more priority from the "17:00" in the meaning of target data 14 based on the results of processing performed by the analyzer 22 and the counter 24, the component 52 which is the character of "convenience store" is displayed larger than the component 54 which is the character of "17:00". It goes without saying that the level of priority of a component may be represented in a display mode using a parameter other than the size. For instance, when a component is a character, the level of priority of the component may be represented by the font of the component.

Figure 3:
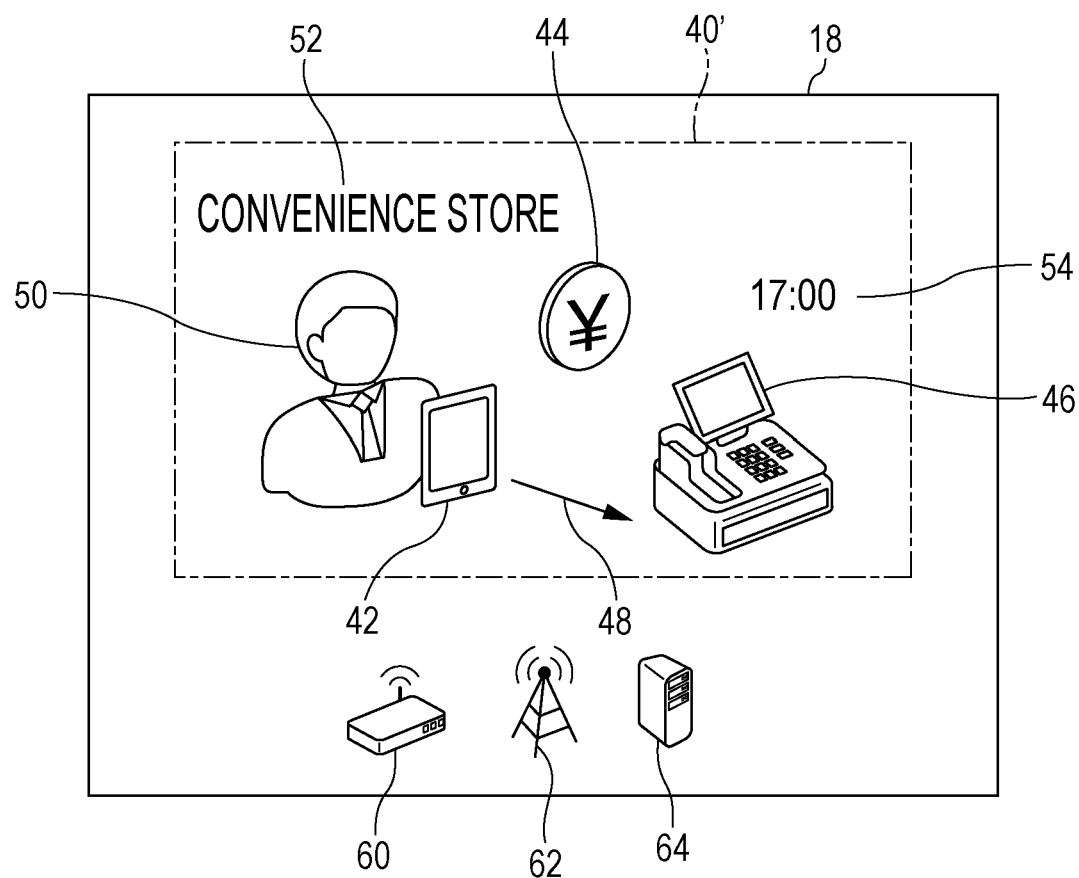
FIG. 3 is a view illustrating a second display example of a semantic figure.

Also, the display controller 30 may display graphics, photographs, and characters not included in the semantic figure 40 (hereinafter referred to as "non-components") along with the semantic figure 40. In the example of FIG. 3, non-components 60 to 64 are illustrated. The non-components 60 to 64 represent, for instance, a part having a level of priority lower than the level of priority of a part of the target data 14, based on which the semantic figure 40 is generated.

The non-components 60 to 64 are displayed in a display mode which allows the non-components 60 to 64 to be distinguished from the components 42 to 54 included in the semantic figure 40. For instance, the components 42 to 54 included in the semantic figure 40 are disposed close to each other, and the non-components 60 to 64 are displayed at positions spaced away from the components 42 to 54. Alternatively, the components 42 to 54 may be displayed in a size larger than the non-components 60 to 64. Also, the components 42 to 54 and the non-components 60 to 64 may be displayed in different colors, or when each of the components is a character, the components 42 to 54 and the non-components 60 to 64 may be displayed in different fonts or with different thicknesses.

As described above, the semantic figure generator 26 may generate multiple semantic figures that represent the meaning of multiple parts of the target data 14. In particular, the semantic figure generator 26 may generate for each of the categories in the meaning of the target data 14. The display controller 30 may display multiple semantic figures corresponding to the categories.

Figure 4:
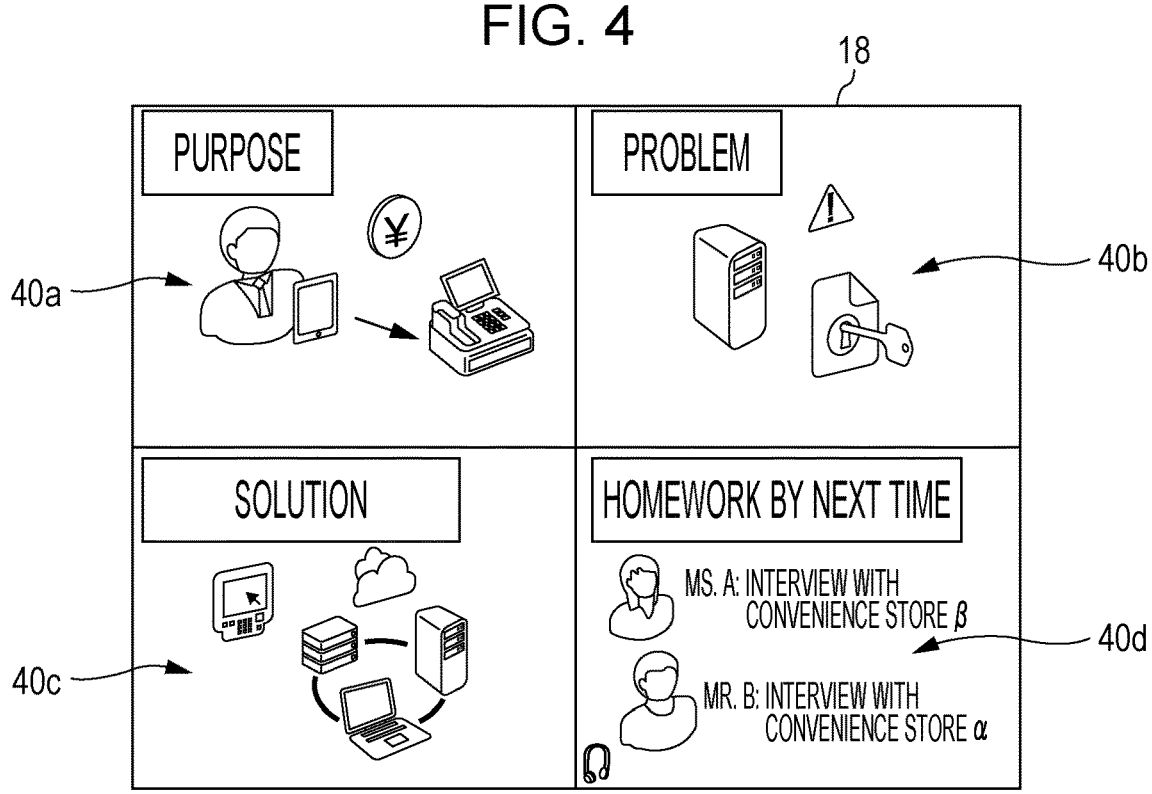
FIG. 4 is a view illustrating a first display example of a semantic figure that is displayed for each of categories.

FIG. 4 illustrates a first display example of multiple semantic figures corresponding to multiple categories. In the example of FIG. 4, the analyzer 22 divides the target data 14 into four categories: the purpose, the problem, the solution, and the homework by the next time, the semantic figure generator 26 generates a semantic figure 40*a* corresponding to the purpose, a semantic figure 40*b* corresponding to the problem, a semantic figure 40*c* corresponding to the solution, and a semantic figure 40*d* corresponding to the homework by the next time, and the display controller 30 displays the semantic figures 40*a* to 40*d* on the display 18.

The semantic figures 40*a* to 40*d* corresponding to the categories may represent respective summary character strings of the categories generated by the analyzer 22. In FIG. 4, for instance, the semantic figure 40*a* represents the summary character string of the purpose in the target data 14, the semantic figure 40*b* represents the summary character string of the problem in the target data 14, the semantic figure 40*c* represents the summary character string of the solution in the target data 14, and the semantic figure 40*d* represents the summary character string of the homework by the next time in the target data 14.

Alternatively, the semantic figures 40*a* to 40*d* corresponding to the categories may represent respective parts (for instance, priority parts) of the summary character strings of the categories of the target data 14.

Figure 5:
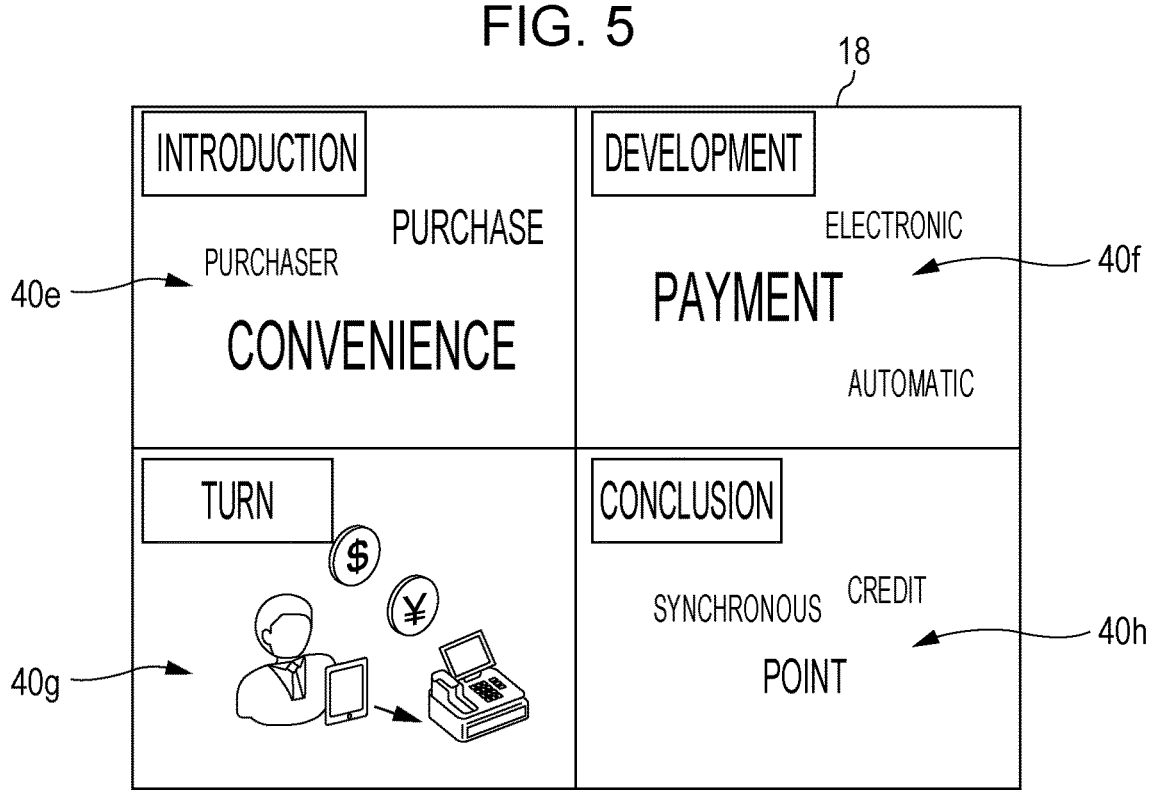
FIG. 5 is a view illustrating a second display example of a semantic figure that is displayed for each of categories.

FIG. 5 illustrates a second display example of multiple semantic figures corresponding to multiple categories. In the example of FIG. 5, the analyzer 22 divides the target data 14 into introduction, development, turn, and conclusion, the semantic figure generator 26 generates a semantic figure 40*e* corresponding to the introduction, a semantic figure 40*f* corresponding to the development, a semantic figure 40*g* corresponding to the turn, and a semantic figure 40*h* corresponding to the conclusion, and the display controller 30 displays the semantic figures 40*e* to 40*h* on the display 18.

Figure 6:
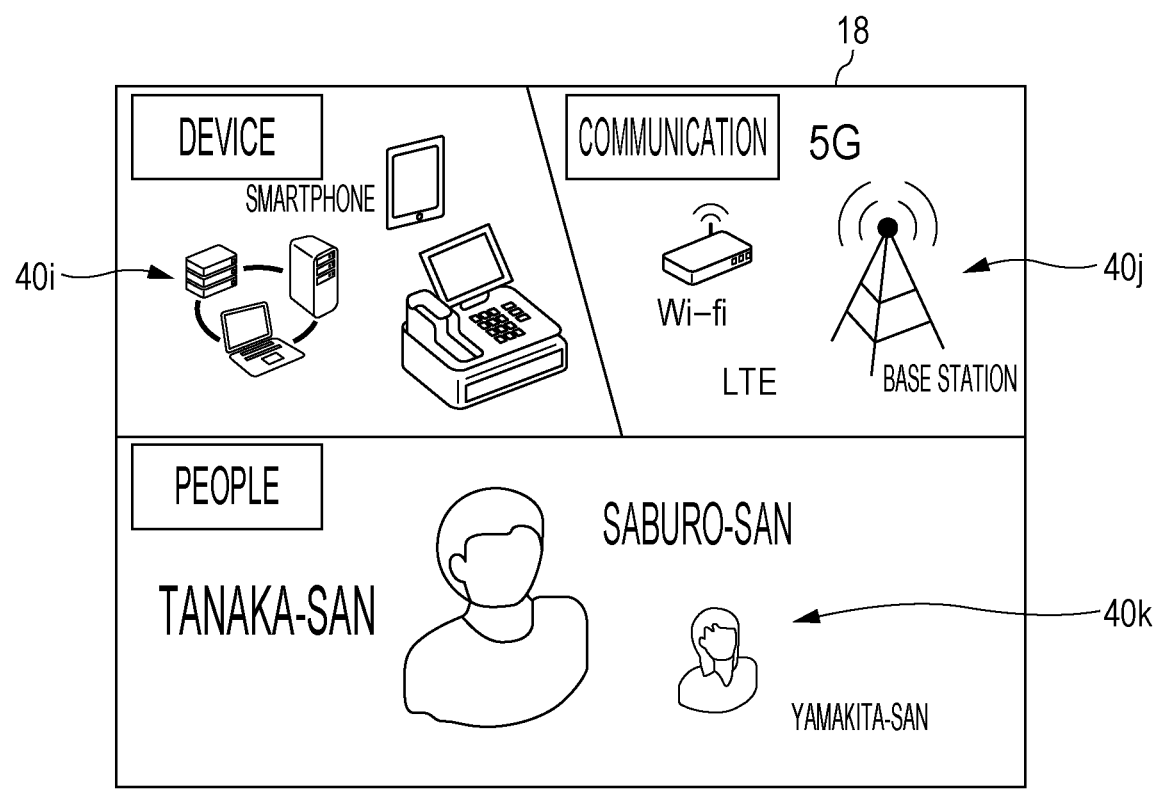
FIG. 6 is a view illustrating a third display example of a semantic figure that is displayed for each of categories.

Also, FIG. 6 illustrates a third display example of multiple semantic figures corresponding to multiple categories. In the example of FIG. 6, the analyzer 22 divides the target data 14 into three categories from the viewpoint of three concepts of device, communication, and people, the semantic figure generator 26 generates a semantic figure 40*i* corresponding to the device, a semantic figure 40*j* corresponding to the communication, and a semantic figure 40*k* corresponding to the people, and the display controller 30 displays the semantic figures 40*i* to 40*k* on the display 18.

The semantic figure 40*i* represents the target data 14 from the viewpoint (specifically, what type of device appears in the target data 14, and what type of role the device has in the target data 14) of device, the semantic figure 40*j* represents the target data 14 from the viewpoint of communication, and the semantic figure 40*k* represents the target data 14 from the viewpoint of people.

In this case, based on the meaning of terms represented by the components included in the semantic figures 40*i* to 40*k*, a display mode of the components may be determined. For instance, in the category of people, when "Tanaka-san" has more priority than "Saburo-san", the component indicating "Saburo-san" may be displayed larger than the component indicating "Tanaka-san". Also, in the same category, a positional relationship for displaying two components representing two terms may be determined based on the relevance between the two terms. For instance, in the category of communication, when the relevance between "Wi-Fi" and "LTE" is high, the component indicating "Wi-Fi" and the component indicating "LTE" may be displayed at close positions.

As illustrated in FIGS. 4 to 6, multiple semantic figures 40 according to multiple categories of the target data 14 may be displayed. Consequently, the same target data 14 can be represented by various methods. It is to be noted that as described above, the categories into which the target data 14 is divided may be designated by a user.

Also, when multiple semantic figures 40 according to multiple categories are displayed, a component indicating the same term may be included in different semantic figures 40. For instance, in the example of FIG. 5, although the semantic figure 40*e* includes the component of the character of "convenience", other semantic figures 40*f* to 40*h* may also include the component of the character of "convenience".

As described above, a layout for multiple semantic figures 40 is set by the layout setting part 28 according to an instruction of a user.

When a semantic figure 40 displayed on the display 18 is selected by a user, the display controller 30 may display an explanation of the selected semantic figure 40. In other words, the display controller 30 also functions as an explanation output interface.

Figure 7:
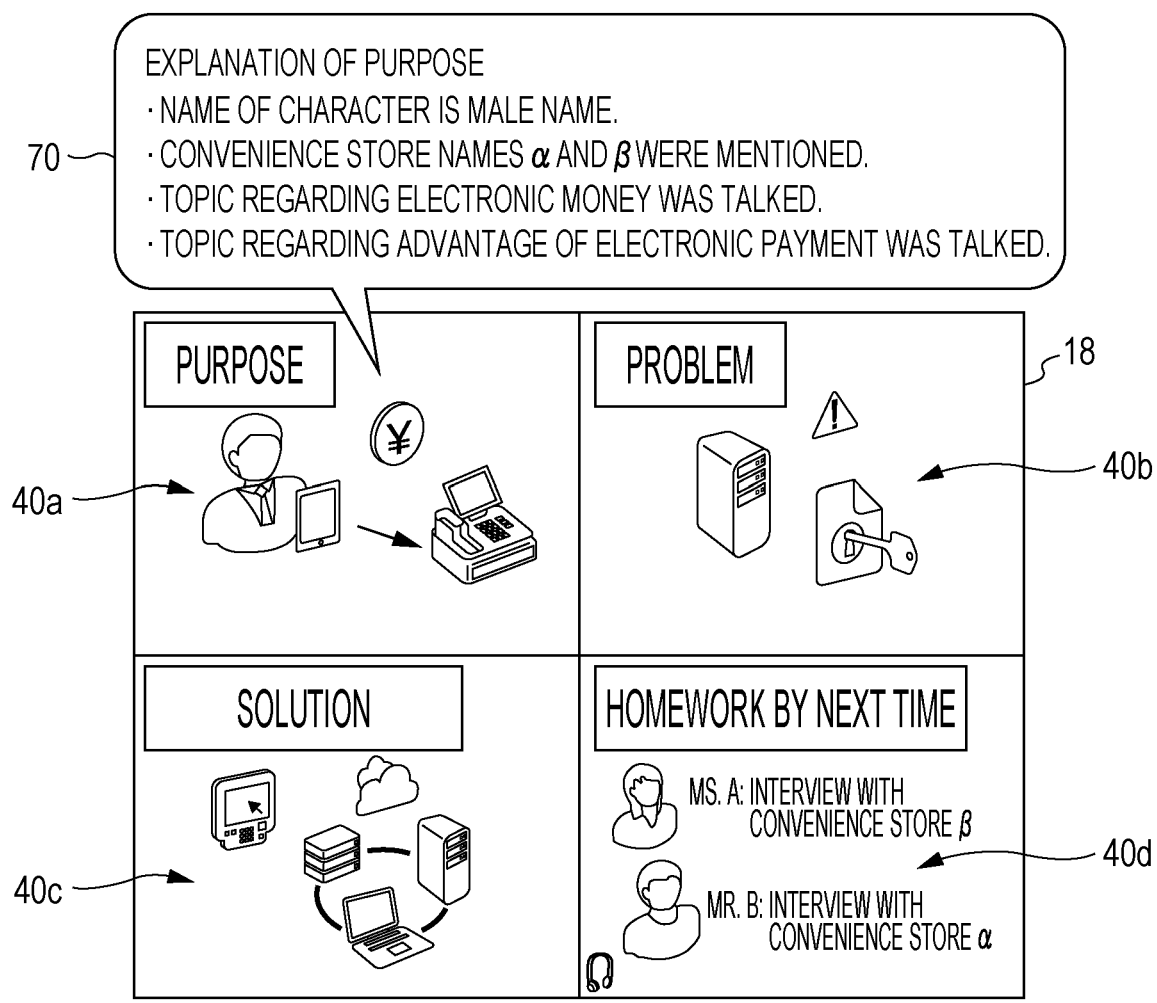
FIG. 7 is a view illustrating a display example of explanation of semantic figures.

For instance, as illustrated in FIG. 7, when multiple semantic figures 40*a* to 40*d* corresponding to multiple categories of the target data 14 are displayed and a semantic figure 40*a* is selected by a user, the display controller 30 displays an explanation 70 of the semantic figure 40*a* based on the meaning of the target data 14 obtained by the analyzer 22. The contents of the explanation 70 show the reason why the semantic figure 40*a* is represented in that way. For instance, in the example of FIG. 7, it can be seen from the explanation 70 that the reason why the semantic figure 40*a* includes a graphic indicating "male" is because the name of a character is a male name in the purpose category of the target data 14. Also, it can be seen from the explanation 70 that the reason why the semantic figure 40*a* includes graphics indicating "smartphone", "cash register", and "money" is because a topic regarding electronic money and a topic regarding advantage of electronic payment were present in the purpose category of the target data 14. The contents of the explanation 70 may be generated by the analyzer 22 or the semantic figure generator 26, and may be all or part of a summary character string represented by the semantic figure 40*a*.

FIG. 7 is an example in which when multiple semantic figures 40 are displayed, the explanation 70 is displayed. However, even when one meaning figure 40 is displayed as in FIG. 2 or 3, an explanation may be displayed when a semantic figure 40 is selected by a user.

Also, when the semantic figure 40 does not represent a summary character string and represents part of a character string extracted from the target data 14, part of the character string may be displayed as it is as the explanation 70. For instance, in the example of FIG. 2 or 3, when the semantic figure 40 is selected by a user, "electronic payment is made with a smartphone at a convenience store at 17:00" may be displayed as the explanation.

It is to be noted that the explanation may be outputted as voice. In this case, a voice output interface (not illustrated) including a loudspeaker of the information processing device 10 functions as the explanation output interface.

The semantic figure generator 26 may be unable to generate a semantic figure 40 in a category among the multiple categories of the target data 14. For instance, the reason may be because the analyzer 22 is unable to generate a summary character string in the category or the semantic figure generator 26 is unable to identify a priority part in the category.

Figure 8:
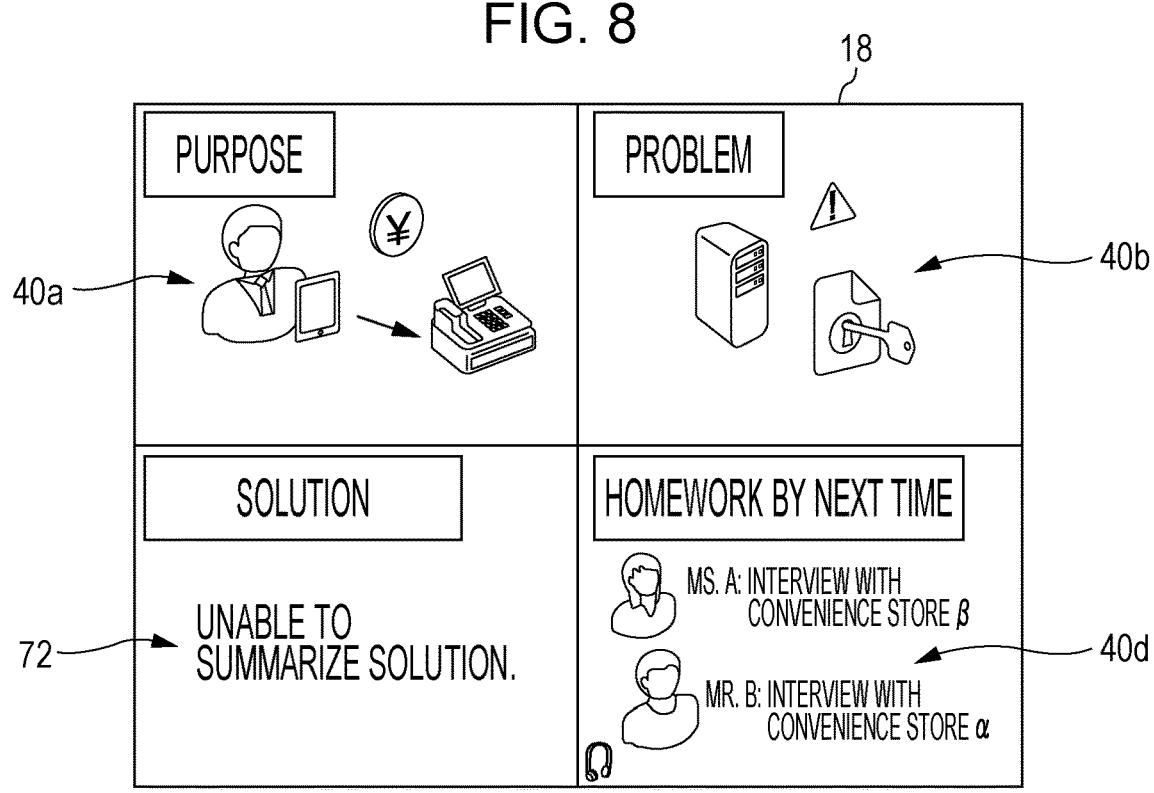
FIG. 8 is a view illustrating a display example of an error notification.

When a semantic figure 40 in a category among the multiple categories is not generated, the display controller 30 displays an error notification to notify a user of the situation. FIG. 8 illustrates an example of error notification 72 displayed when a semantic figure 40*c* corresponding to the solution out of the purpose, problem, solution, and homework by the next time is not generated.

For instance, when the target data 14 are the minutes of a meeting, the display of the error notification 72 allows a user to easily understand that discussion on the solution in the meeting is not sufficient. It is to be noted that the contents of the error notification 72 may include a reason why a semantic figure 40 has not been generated. For instance, a character string such as "discussion on the solution has not been conducted" or "multiple solutions have been provided, but none of them is a decisive solution" may be displayed as the error notification 72.

As described above, according to the first exemplary embodiment, the semantic figure generator 26 generates a semantic figure which represents at least part of the target data 14, and the display controller 30 displays the semantic figure 40 on the display 18. A user can quickly grasp the summary of the target data 14 by checking the displayed semantic figure 40, as compared with when a user checks all the target data 14.

Second Exemplary Embodiment

The schematic configuration of an information processing device according to a second exemplary embodiment is the same as the schematic configuration of the information processing device (the information processing device 10 of FIG. 1) according to the first exemplary embodiment. Therefore, a description of a portion overlapping with the first exemplary embodiment is omitted.

In the second exemplary embodiment, according to the number of times of appearance, counted by the counter 24, of each of multiple terms which appear in the target data 14, the display controller 30 displays a term expression representing each term on the display 18. Here, the term expression may be a character, a graphic, or a photograph. For instance, the term expression for the term "smartphone" is the character of smartphone, a graphic indicating a smartphone, or a photograph of a smartphone.

Specifically, for a term with a greater number of times of appearance in the target data 14, the display controller 30 displays a term expression corresponding to the term in a larger font. In other words, a term expression corresponding to a term with a less number of times of appearance in the target data 14 is displayed in a relatively small font. Alternatively, a term expression corresponding to a term with a greater number of times of appearance may be displayed in a dark color. In other words, a term expression corresponding to a term with a less number of times of appearance may be displayed in a relatively light color. Alternatively, when a term expression is a character, a term expression (character) corresponding to a term with a greater number of times of appearance may be displayed in a thick font. In other words, a term expression corresponding to a term with a less number of times of appearance in the target data 14 may be displayed in a relatively thin font.

More specifically, the display controller 30 displays a term expression representing each term at a position according to the meaning of the term. The concept of displaying a term expression at a position according to the meaning of the term includes two modes.

Figure 9:
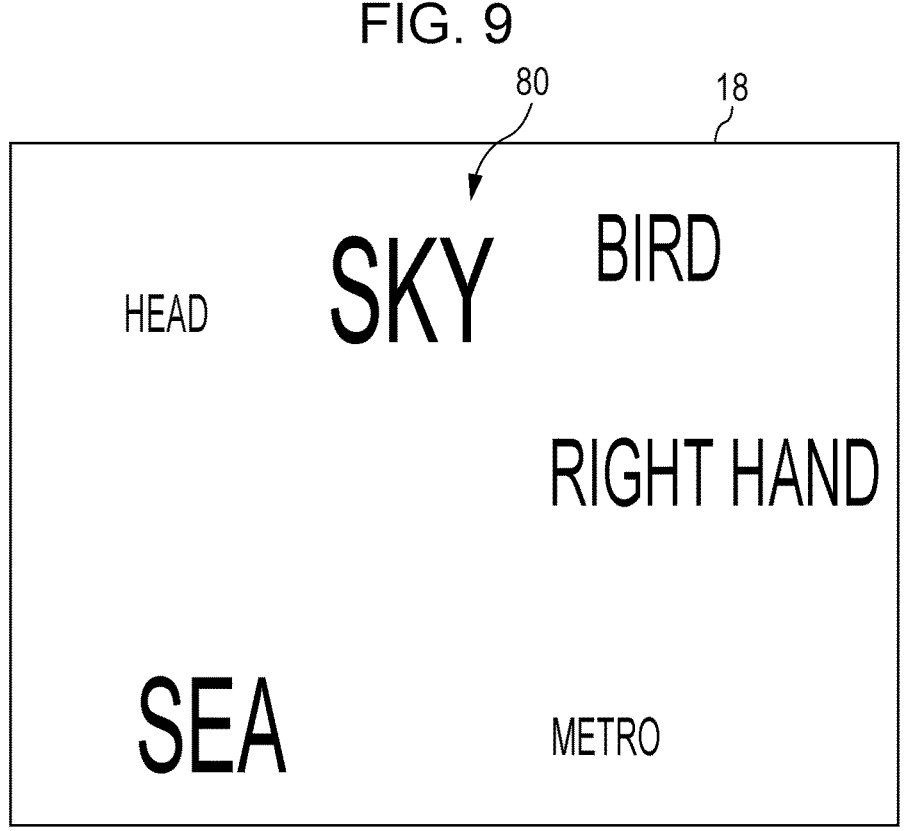
FIG. 9 is a view illustrating an example in which term expressions are each displayed at a position according to the meaning of each term.

In a first mode, a term expression of a single term is displayed at a position according to the meaning of the term. For instance, when the term is "sky", "bird", "head", or "roof", the display controller 30 displays a corresponding term expression at an upper portion of the display 18. Also, when the term is "sea", "metro", "ground", or "leg", the display controller 30 displays a corresponding term expression at a lower portion of the display 18. Similarly, the display controller 30 displays a term expression corresponding to "right hand" or "right leg" at a right portion of the display 18, and displays a term expression corresponding to "left hand" or "left leg" at a left portion of the display 18. FIG. 9 illustrates the manner in which term expressions 80 are each displayed at a position according to the meaning of a corresponding term.

Alternatively, the display controller 30 may display the term expression corresponding to a specific term at a position set by a user. In the exemplary embodiment, for a specific term, a user can set a position at which a term expression corresponding to the specific term is displayed. For instance, the display position of a term expression corresponding to the term "machine" may be set to the center of the display 18.

Figure 10:
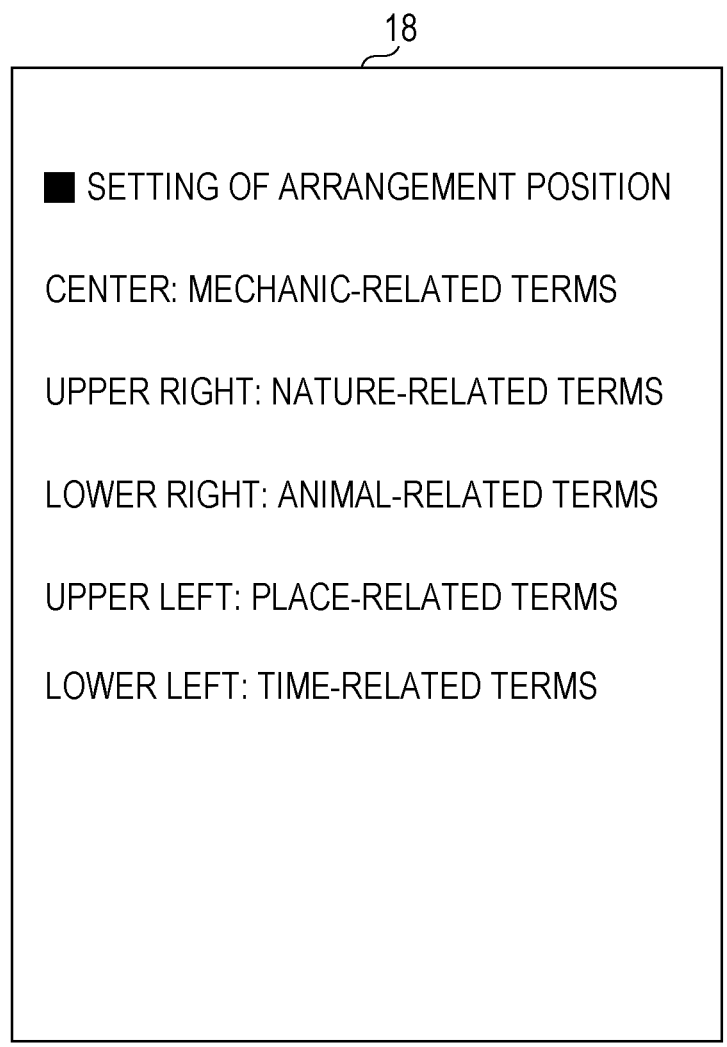
FIG. 10 is an example of a screen for setting display positions of term expressions.

Also, for each type of term, the display position of a corresponding term expression may be set by a user. For instance, the display controller 30 displays on the display 18 a screen for setting display positions of term expressions as illustrated in FIG. 10. A user inputs a type of term to the setting screen, thereby making it possible to set a display position of each term expression according to the type of term.

In the setting screen illustrated in FIG. 10, a user can set the term expressions corresponding to terms, to be displayed at respective positions of the center, the upper right, the lower right, the upper left, and the lower left of the display 18. In FIG. 10, setting has been made so that term expressions corresponding to mechanic-related terms are displayed at the center of the display 18, term expressions corresponding to nature-related terms are displayed at the upper right of the display 18, term expressions corresponding to animal-related terms are displayed at the lower right of the display 18, term expressions corresponding to place-related terms are displayed at the upper left of the display 18, and term expressions corresponding to time-related terms are displayed at the lower left of the display 18.

Figure 11:
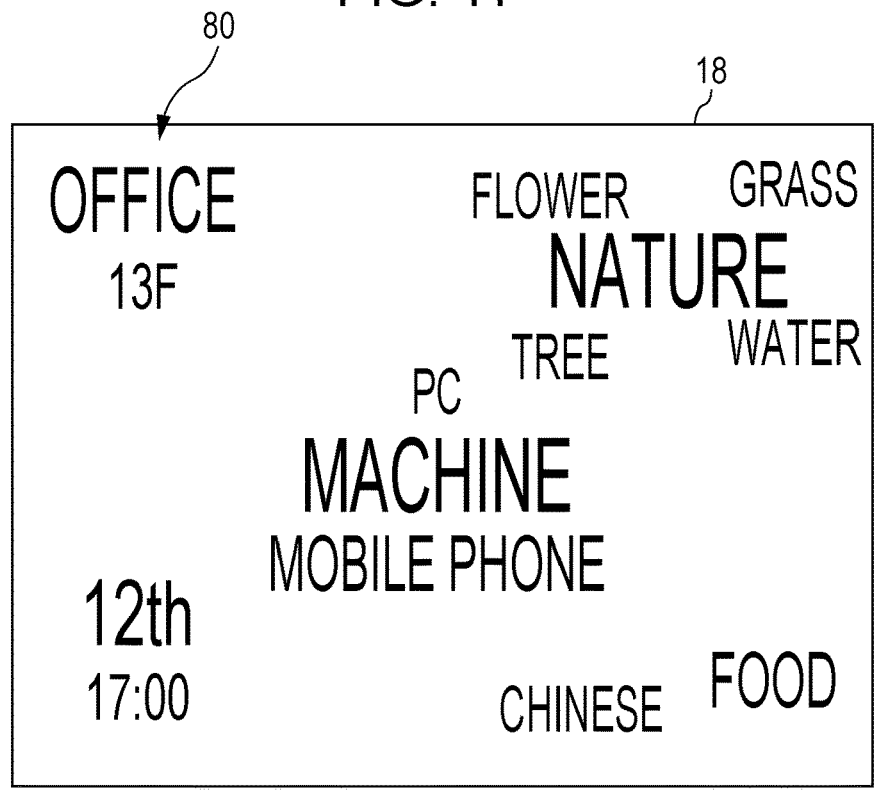
FIG. 11 is a view illustrating a display example in which term expressions are displayed at set display positions.

FIG. 11 illustrates a display example in which the term expressions 80 are displayed as in the setting illustrated in FIG. 10. When a type of term set by a user does not appear in the target data 14, the display controller 30 may display a term expression 80 corresponding to another type of term instead of the type of term at a position at which a term expression 80 corresponding to the type of term originally set by a user is to be displayed. Such another type of term may be determined, for instance, based on the number of times of appearance in the target data 14. In the example of FIG. 11, an animal-related term does not appear in the target data 14 but a food-related term appears many times, and thus term expressions 80 corresponding to food-related terms are displayed instead of animal-related terms at a lower right area of the display 18.

In a second mode, two term expressions corresponding to two terms are displayed in a positional relationship according to the relevance between the meanings of the two terms. For instance, for two terms having a higher degree of similarity in the meaning, the display controller 30 displays two term expressions corresponding to the two terms in greater proximity. In other words, for two terms having a lower degree of similarity in the meaning, the display controller 30 displays two term expressions corresponding to the two terms apart from each other. Here, a degree of similarity between two terms can be determined based on a thesaurus that is a systematic database in which terms are classified based on a superordinate/subordinate relationship, a part/whole relationship, a synonymous relationship, and a quasi-synonymous relationship. The "similarity" in the present description is a concept that is applicable to not only terms indicating a similar meaning (for instance, "PC" and "machine"), but also terms having a high relevance (for instance, "insect" and "soil").

Figure 12:
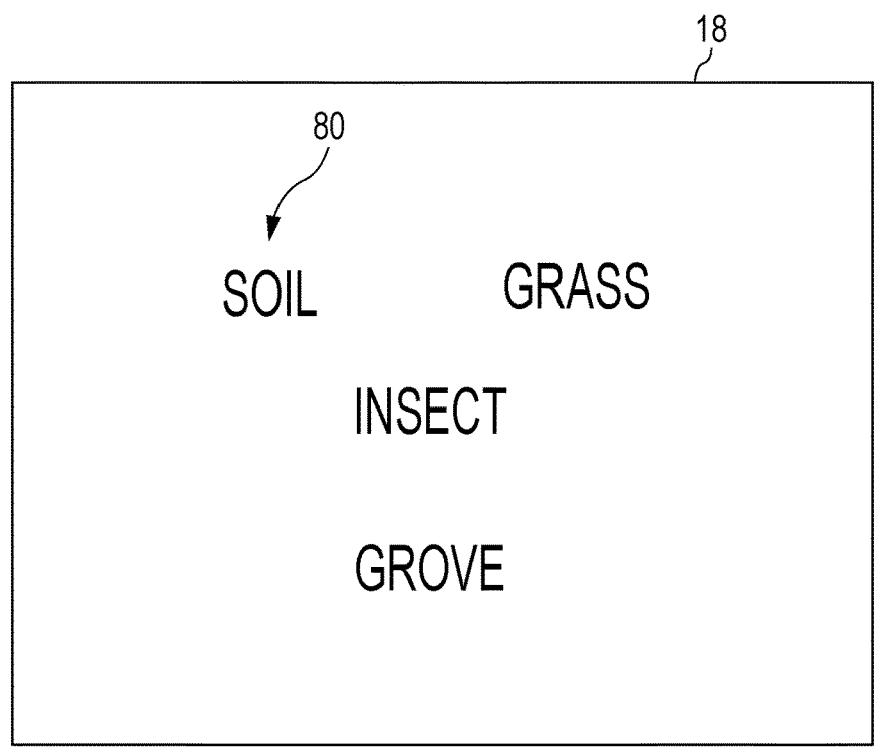
FIG. 12 is a first figure illustrating a display example in which term expressions corresponding to terms with a similar meaning are displayed in proximity.

When one term is equally similar to other multiple terms, a term expression corresponding to the one term is displayed between multiple term expressions corresponding to other multiple terms. For instance, when the term "insect" is similar to both "soil" and "grass", the display controller 30 displays a term expression corresponding to the "insect" between the term expression corresponding to the "soil" and the term expression corresponding to the "grass". Also, for instance, the term "insect" is similar to any one of "soil", "grass", and "grove", as illustrated in FIG. 12, the display controller 30 displays a term expression corresponding to the "soil", a term expression corresponding to the "grass", and a term expression corresponding to the "grove" around a term expression corresponding to the "insect".

Figure 13:
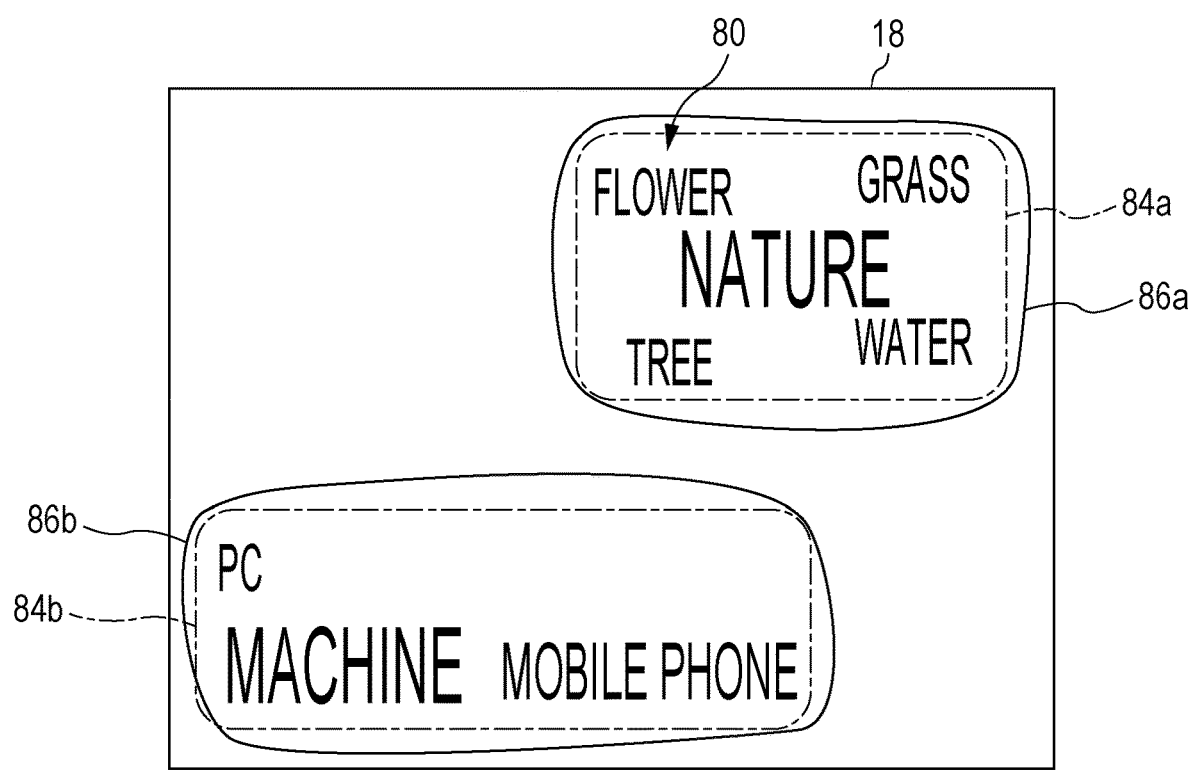
FIG. 13 is a second figure illustrating a display example in which term expressions corresponding to terms with a similar meaning are displayed in proximity.

FIG. 13 is a figure illustrating a display example in which term expressions 80 corresponding to terms with a similar meaning are displayed in proximity. As illustrated in FIG. 13, for instance, the term expressions 80 corresponding to "nature", "flower", "grass", "tree", and "water" which are terms having a high degree of similarity are displayed in proximity. Consequently, a term expression group 84a is formed in which the term expressions 80 corresponding to multiple terms having a similar meaning are in proximity.

It is to be noted that when there are terms in a superordinate/subordinate concept relationship among the multiple terms having a similar meaning, the display controller 30 displays a term expression corresponding to a term in the subordinate concept around a term expression corresponding to a term in the superordinate concept. For instance, in the term expression group 84a illustrated in FIG. 13, "nature" is a superordinate concept, and "flower", "grass", "tree", and "water" are each a subordinate concept to the "nature". In this case, the display controller 30 displays the term expression 80 corresponding to "nature" at the center of the term expression group 84a, and displays the term expressions 80 corresponding to "flower", "grass", "tree", and "water" around the term expression 80 corresponding to the "nature".

In FIG. 13, in addition to the term expression group 84a, term expressions corresponding to "PC", "machine", and "mobile phone" which are terms having a high degree of similarity are displayed in proximity. Consequently, a term expression group 84b is formed. In this manner, multiple term expression groups 84a, 84b may be formed by displaying the term expressions in proximity, which correspond to terms having a high degree of similarity.

The display controller 30 may display the term expressions 80 included in the term expression group 84a and the term expressions 80 not included in the term expression group 84a in respective display modes in an identifiable manner. Similarly, the display controller 30 display the term expressions 80 included in the term expression group 84b and the term expressions 80 not included in the term expression group 84b in respective display modes in an identifiable manner.

For instance, as illustrated in FIG. 13, a frame 86a surrounding the multiple term expressions 80 included in the term expression group 84a, and a frame 86b surrounding the multiple term expressions 80 included in the term expression group 84b may be displayed. Alternatively, the area in the frame 86a, the area in the frame 86b, and other areas may be colored in different colors. Alternatively, the colors of the term expressions included in the term expression group 84a are unified as well as the colors of the term expressions included in the term expression group 84b are unified, then the color of the term expressions included in the term expression group 84a, the color of the term expressions included in the term expression group 84b, and the color of other term expressions 80 may be made different colors.

As described above, according to the second exemplary embodiment, a term expression corresponding to a term which appears in the target data 14 is displayed at a position according to the meaning of the term. Consequently, a user can grasp the meaning of the target data 14 more easily, as compared with when a term expression is not displayed at a position according to the meaning of the term.

Third Exemplary Embodiment

The schematic configuration of an information processing device according to a third exemplary embodiment is also the same as the schematic configuration of the information processing device (the information processing device 10 of FIG. 1) according to the first exemplary embodiment. Therefore, a description of a portion overlapping with the first exemplary embodiment is omitted.

In the third exemplary embodiment, the display controller 30 displays an image representing the target data 14 on the display 18. Although a semantic figure 40 (see FIG. 2) generated by the semantic figure generator 26 is displayed on the display 18 in the first exemplary embodiment, the image representing the target data 14 in the third exemplary embodiment is not limited to the semantic figure generated by the semantic figure generator 26. When the target data 14 is a dynamic image, the image representing the target data 14 may be a still image cut out from the dynamic image. Alternatively, the image representing the target data 14 may be an image which is obtained by processing (for instance, monochrome processing or processing for converting to an illustration style) a still image cut out from the dynamic image.

Figure 14:
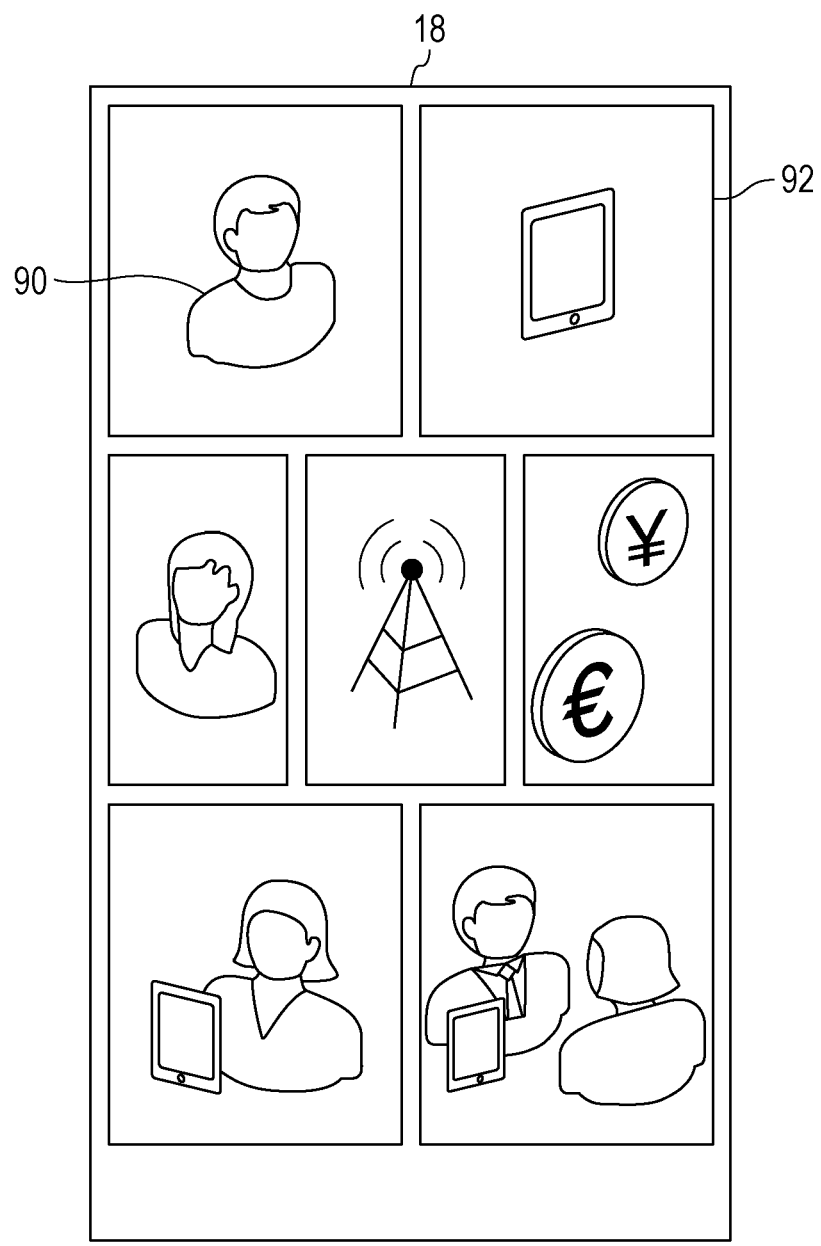
FIG. 14 is a view illustrating a display example of multiple images representing target data.

FIG. 14 illustrates a display example of an image representing the target data 14 in the third exemplary embodiment. As illustrated in FIG. 14, the display controller 30 can display multiple frames 92 which include respective images 90 representing the target data 14 like comics. It is to be noted that one image 90 is to be included in one frame 92 in the exemplary embodiment.

For instance, when target data 14 is a dynamic image, the display controller 30 cuts out multiple still images from the dynamic image, and displays multiple frames 92 including the still images as the images 90 next to each other so that the multiple still images are arranged in a time series sequence. It is to be noted that the display controller 30 may cut out a still image corresponding to a priority part in the target data 14 from the dynamic image. As described above, a priority part in the target data 14 can be identified, for instance, based on a result of analysis by the analyzer 22 or a result of count by the counter 24.

It goes without saying that each of the images 90 may be a semantic figure generated in the first exemplary embodiment. In this case, for instance, the semantic figure generator 26 generates multiple semantic figures representing the target data 14, and the display controller 30 displays multiple frames 92 including respective generated semantic figures next to each other so as to represent the meaning of the target data 14. When the target data 14 is a dynamic image and each image 90 of FIG. 14 is a semantic figure, for instance, the first frame is a semantic figure representing the contents of the dynamic image from 0:00 to 1:00, and the second frame is a semantic figure representing the contents of the dynamic image from 1:01 to 2:00.

In the third exemplary embodiment, attention is focused on a feature that allows a user to set a layout (display) of the images 90 which represent the target data 14. The display controller 30 displays the images 90 on the display 18 according to the layout set by a user.

The layout setting part 28 sets a layout for the images 90 based on an instruction of a user. The information processing device 10 receives an instruction from a user regarding the layout for the images 90 via the input interface 16. Specifically, the input interface 16 also functions as a receiving interface. Specifically, as a layout for the images 90, the layout setting part 28 sets, for instance, the number of frames 92 on one screen (in other words, the number of images 90 included in one screen), the number of screens, and the positions, sizes, and arrangement of the frames 92.

A user can set a layout for the images 90 by several methods. Input methods for instructing a change of a layout by a user may be any one of a touch operation, a voice-activated operation, a non-contact gesture operation, a pointer operation of a mouse, and input of a text command. However, in consideration of the convenience and operational mistake of a user, the input methods may be switchable by a user setting so that only a specific input method is received. For instance, when the noise in the surrounding area is high or there are many people in the surrounding area, the setting may be changed so that voice input is not received, and only a touch operation is received.

As the first method, the display controller 30 displays a layout setting screen on the display 18 for allowing a user to input a layout, and a user sets a layout by inputting the a layout to the layout setting screen using the input interface 16.

Figure 15A:
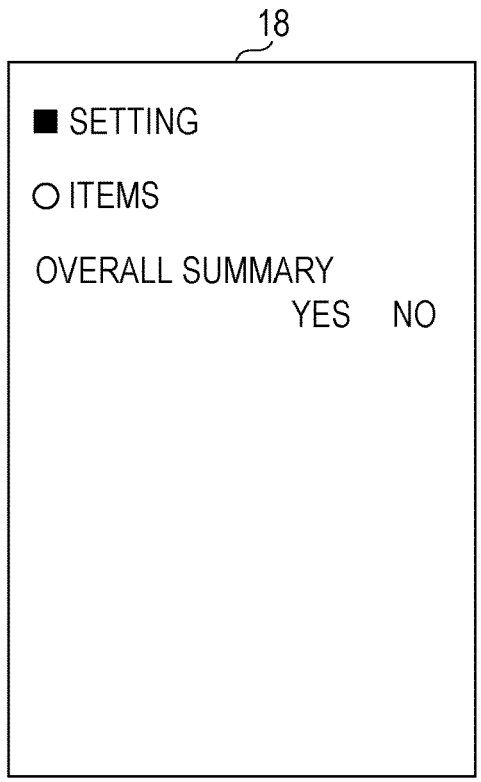
FIGS. 15A to 15C are views illustrating examples of a screen for setting layout.
Figure 15B:
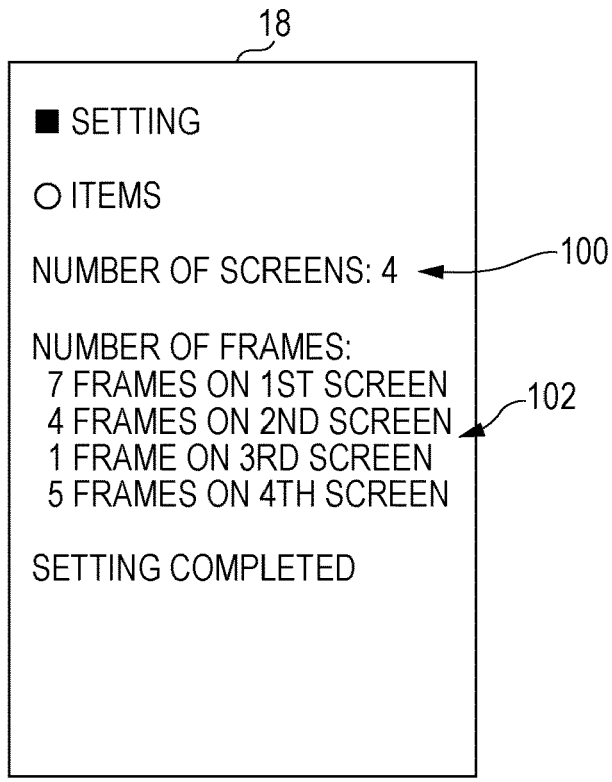
Figure 15C:
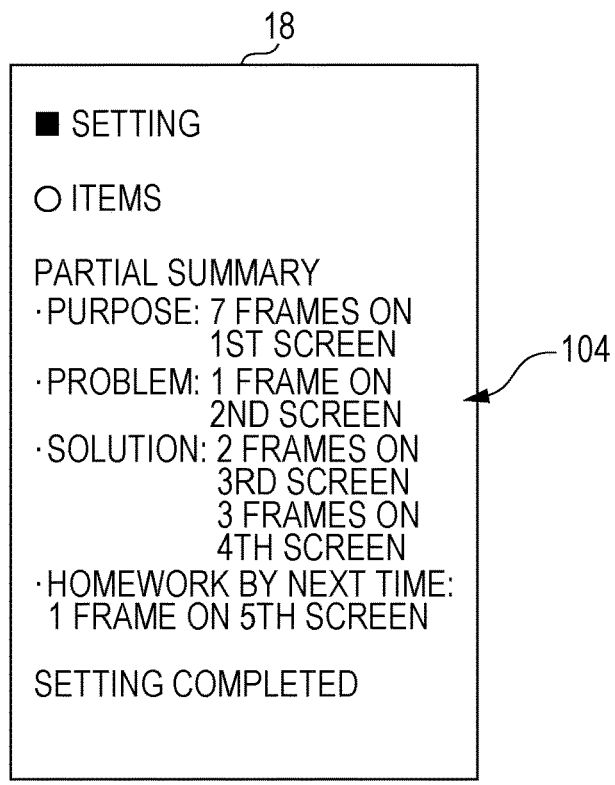

FIGS. 15A to 15C illustrate examples of a layout setting screen. When a user operates the information processing device 10 to call the layout setting screen, a screen as illustrated in FIG. 15A is first displayed on the display 18.

The screen illustrated in FIG. 15A is for setting whether or not the entire target data 14 is summarized. Here, when a user inputs an instruction for summarizing the entire target data 14, the screen illustrated in FIG. 15B is displayed on the display 18.

The screen illustrated in FIG. 15B is for inputting a layout for the images 90 (that is, the frames 92) which represent the entire target data 14. For instance, in the screen illustrated in FIG. 15B, there are provided a field 100 and a field 102, the field 100 receiving input of the number of screens on which the images 90 representing the entire target data 14 are displayed, the field 102 receiving input of the number of frames per screen. A user can set a layout for the images 90 by inputting a desired number to the fields 100 and 102. For instance, when the number of screens is 1 and the number of frames on the 1st screen is 4, 4 semantic figures representing the entire target data 14 is displayed on one screen. Also, when the number of screens is 2 and the number of frames per screen is 1, 2 semantic figures representing the entire target data 14 are each displayed on one screen.

Although only the number of screens and the number of frames per screen are settable in the screen of FIG. 15B, the positions, sizes, and arrangement of the frames may be settable on each screen. Alternatively, a value for a setting item such as the number of screens and the number of frames may be input in a free form, or may be selected from options such as a pull down menu.

In the screen illustrated in FIG. 15A, when a user inputs an instruction for not summarizing the entire target data 14, the screen illustrated in FIG. 15C is displayed on the display 18.

The display controller 30 can display images 90 for each of the categories in the meaning of the target data 14. For instance, the display controller 30 can display multiple frames 92 representing the categories such as the purpose, problem, solution, and homework by the next time. The layout setting part 28 can set a layout for the images 90 for each of the categories in the meaning of the target data 14. In other words, a layout for multiple frames 92 in each category is settable by a user. It goes without saying that the categories are not limited to the purpose, problem, solution, and homework by the next time, and for instance are described above, the components may be distinguished by the introduction, development, turn, and conclusion, or the concepts of device, communication, and people.

The screen illustrated in FIG. 15C is for inputting a layout for the images 90 (that is, the frames 92) for each of the categories of the target data 14. For instance, in the screen illustrated in FIG. 15C, there is provided a field 104 for inputting the number of screens and the number of frames per screen to represent the categories (the purpose, problem, solution, and homework by the next time) of the target data 14. A user can set a layout for the images 90 in each category by inputting a desired number to the field 104.

As the second method, a layout is set by a user performing an operation on the display 18 on which the images 90 (the frames 92) are displayed. More specifically, when a user inputs an operation as a layout change instruction to the display 18, the layout setting part 28 changes the layout for the images 90 according to the operation. The operations of a user to the display 18 include, for instance, a tap operation, a double-tap operation, a long-tap operation, a sliding (flick) operation, pinch-in operation, and a pinch-out operation. For instance, when a user performs an operation on a frame 92, the layout setting part 28 can make a layout change to delete the frame 92 to reduce the number of frames. For instance, when a user performs an operation between two frames 92, the layout setting part 28 can make a layout change to add a new frame 92 between the two frames 92 to increase the number of frames. With the second method, a user can make layout setting more intuitively than in the first method. In particular, deletion of a frame 92 at a specific position and addition of a frame 92 at a specific position are more facilitated.

Figure 16:
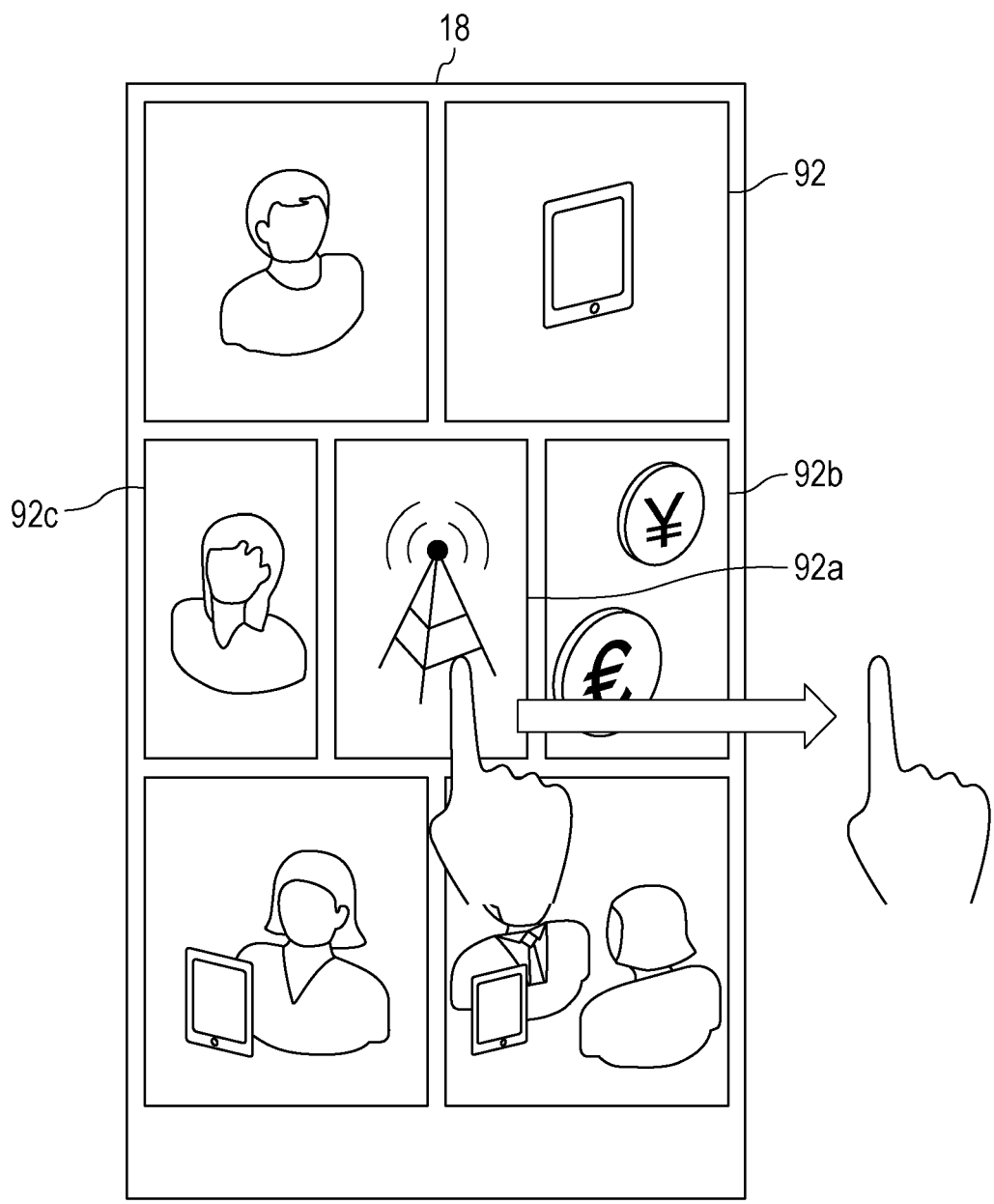
FIG. 16 is a view illustrating the manner in which a frame is deleted by a sliding operation.

FIG. 16 illustrates the manner in which a user performs a sliding operation on the display 18 on which multiple frames 92 (the images 90) are displayed. When the input interface 16 receives a sliding operation from a user, the layout setting part 28 deletes not only a frame 92a located at the start point of the sliding operation, but also another frame 92b located in the sliding direction of the sliding operation from the frame 92a, and may make a layout change to reduce the number of frames by two. Alternatively, in addition to the frames 92a and 92b, another frame 92c located on the opposite side to the sliding direction of the sliding operation from the frame 92a may be deleted to make a layout change to reduce the number of frames by three. In the exemplary embodiment, it is assumed that the frames 92a, 92b, and 92c are deleted to make a layout change to reduce the number of frames by three. In this manner, a user can input an instruction for changing the layout to reduce any multiple frames 92 by a single sliding operation. It is to be noted that a start position may be determined based on a long tap to a frame designated by a user.

The display controller 30 displays the frames 92a, 92b, and 92c in such a mode that while a user is performing a sliding operation, the frames 92a, 92b, and 92c are gradually moved (gradually moved to the right side in the example of FIG. 16) in accordance with the sliding operation, and when the sliding operation is completed, the frames 92a, 92b, and 92c completely disappear from the display 18.

Also, when a user stops the sliding operation during the operation, the layout setting part 28 does not make a layout change, and the display controller 30 returns the frames 92a, 92b, and 92c, which have moved to midway, to the original positions and displays the frames 92a, 92b, and 92c.

Figure 17:
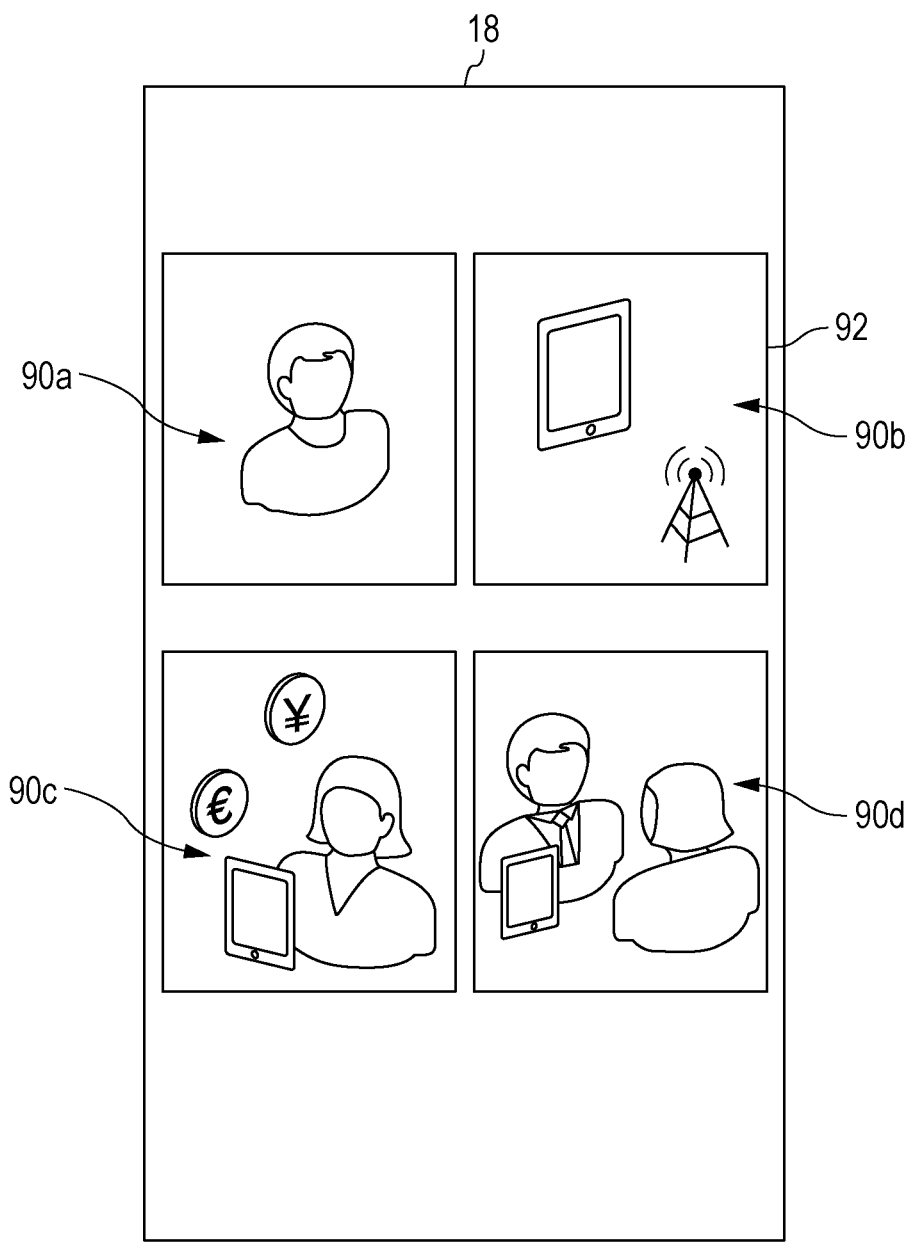
FIG. 17 is a view illustrating a layout after the sliding operation.

When receiving a sliding operation from a user, the layout setting part 28 deletes the frames 92a, 92b, and 92c, and sets a layout of the screen using the remaining four frames 92. In this case, the layout setting part 28 may adjust the positions of the remaining four frames 92 as appropriate so that the area in which the frames 92a, 92b, and 92c are originally present is not unnaturally vacant. FIG. 17 illustrates a display example which is after layout change by a sliding operation and in which the positions of the remaining four frames 92 are adjusted. The display area of the display 18 in FIG. 17 has some extra space, and the image size per frame may be increased or decreased to fill up the display area, and the display area may be adjusted to an optimal size as appropriate for display the frames.

When the input interface 16 receives from a user a superposition operation for superposing multiple frames 92, the layout setting part 28 makes a layout change to merge multiple frames 92 as the target of the superposition operation to a single frame 92. In other words, a layout change is made in which a single frame 92 is displayed in an area in which multiple frames 92 as the target of the superposition operation are displayed.

A superposition operation is a pinch-in operation to pinch multiple frames 92, for instance. Also, the superposition operation may be a drag operation to superpose one frame 92 on another frame 92 with one finger, an operation to move and superpose multiple frames 92 with fingers of both hands, or an operation to input an instruction for superposing multiple frames 92 via voice input or gesture.

Figure 18:
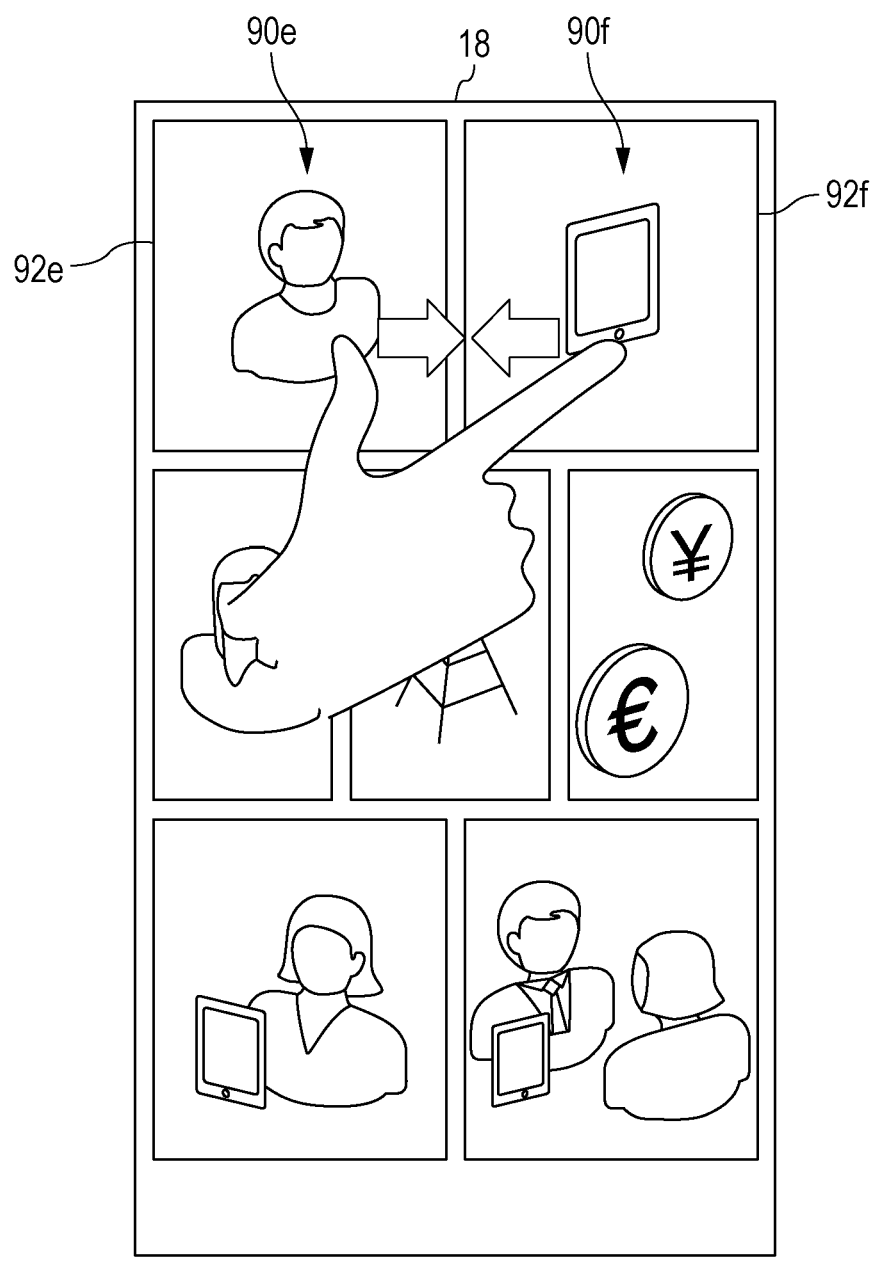
FIG. 18 is a view illustrating the manner in which frames are combined by a pinch-in operation.

FIG. 18 illustrates the manner in which a user performs a pinch-in operation on the display 18 on which multiple frames 92 are displayed. When the input interface 16 receives a pinch-in operation from a user, the layout setting part 28 makes a layout change to merge multiple frames 92 as the target of the pinched-in operation to a single frame 92. In other words, a layout change is made to display a single frame 92 in an area in which multiple frames 92 as the target of the pinched-in operation are displayed. In this manner, designation of frames for a layout change and designation of a display size after the layout change can be made at the same time. It goes without saying that only frames for a layout change may be designated, and a display size may be designated separately. When a display size is set so as not to create an area to merge the frames, after designation of frames is completed, a setting screen for a display size may be displayed, and a display size may be received. It is to be noted that multiple images (frame) may be a target of a pinch-in operation at the same time. Specifically, this corresponds to a situation where when a target is identified by the thumb and the index finger of the right hand, a layout change may be made by designating two frames with the thumb, and three frames with the index finger. In not only the case where a finger is explicitly in contact with at least part of a frame, but also the case where an area (for instance, an area in the vicinity the frame) is pre-set, contact with which is considered to be designation to the frame, even when a finger is not in contact with the frame itself, when a finger is in contact with the area the frame may be a target of the pinch-in operation. In this manner, a user can identify a target by an operation which allows easy designation.

For instance, as illustrated in FIG. 18, when a pinch-in operation is performed, a layout change is made to merge two frames 92e and frame 92f located at two start points (in other words, the positions of two fingers at the time of start of the pinch-in operation) of the pinch-in operation to a single frame 92. When another frame 92 is present between the two frames 92e and frame 92f located at two start points of the pinch-in operation, the two frames 92e and frame 92f, and the another frame 92 are merged.

Figure 19:
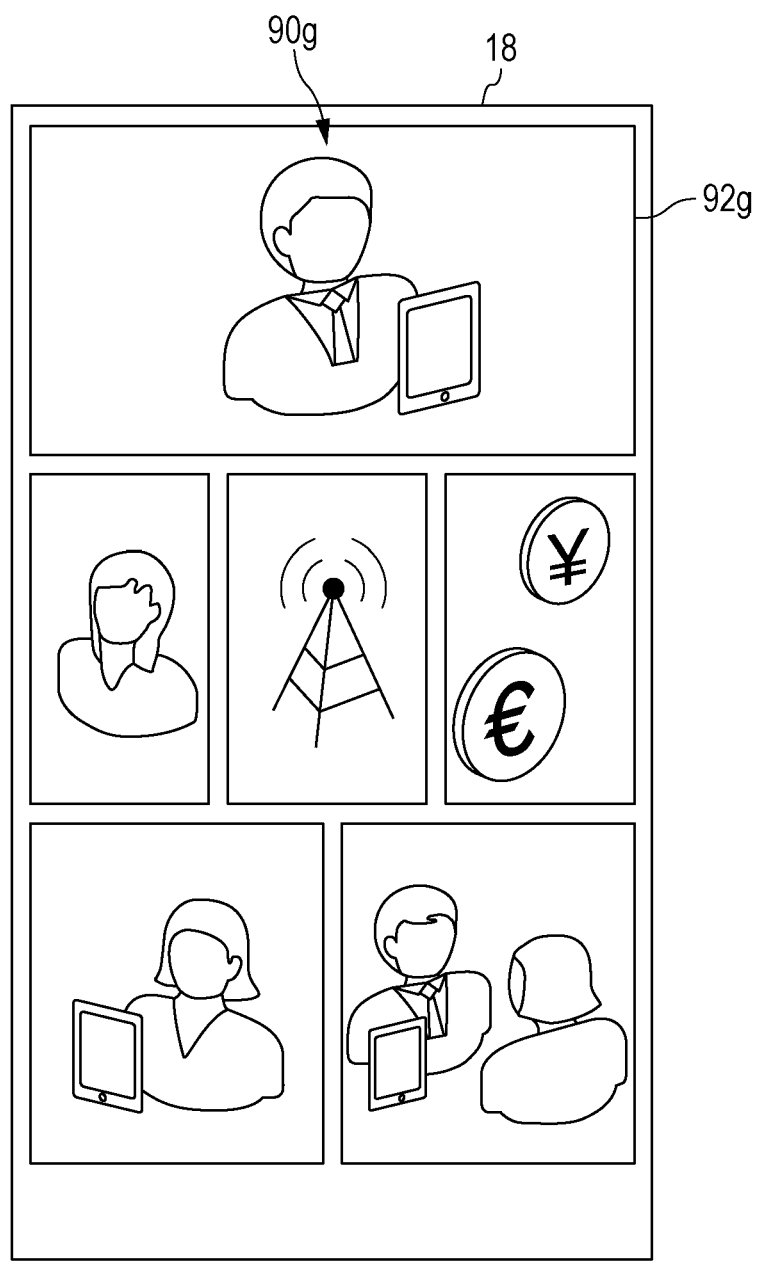
FIG. 19 is a view illustrating a layout after the pinch-in operation.

A user can input an instruction for a layout change to merge any multiple frames 92 by a superposition operation. FIG. 19 illustrates a screen after the layout change in which the two frames 92e and frame 92f are merged to be a single frame 92g. When the size of frame is changed along with the merging as in FIG. 19, the space for a partition between frames which were present before the layout change is eliminated, and the space may be used for the display area of the merged frames after the layout change. Although horizontally adjacent frames are merged in this example of merging, vertically adjacent frames or diagonally adjacent frames may be merged. Also, once merged frame may be repeatedly merged.

While a user is performing a superposition operation (particularly, a superposition operation with fingers), the display controller 30 moves the frames 92e and 92f (moves the frame 92e to the right side and the frame 92f to the left side in the example of FIG. 18) in a direction in which both frames approach in accordance with the superposition operation. When the superposition operation is completed, the display controller 30 deletes the frames 92e and 92f, and displays a new frame 92g.

Also, similarly to the sliding operation, when a user stops the superposition operation during the operation, the layout setting part 28 does not make a layout change, and the display controller 30 returns the frames 92e and 92f, which have moved to midway, to the original positions and displays the frames 92e and 92f.

Also, when the input interface 16 receives an expansion operation on the frame 92 from a user, the layout setting part 28 may make a layout change to expand the size of the frame 92 as the target of the expansion operation. That is, a user can input an instruction for a layout change to expand the size of any frame 92 by the expansion operation. In this case, the size of the frame 92 as the target of the expansion operation may be expanded and frames 92 located in the surroundings of the frame 92 may be reduced.

The expansion operation is a pinch-out operation to operate multiple frames 92 with spread multiple fingers of one hand, for instance. Also, the expansion operation may be an operation to slide fingers of both hands in opposite directions, or an operation to input an instruction for expanding a target frame 92 via voice input or gesture.

Also, when the input interface 16 receives a division operation on a frame 92 from a user, the layout setting part 28 may make a layout change to divide the frame 92 as the target of the division operation into multiple frames 92. That is, a user can input an instruction for a layout change to divide any frame 92 into multiple frames 92 by the division operation.

The division operation may include various operations. For instance, the division operation may be a pinch-out operation on a target frame 92 as illustrated in FIGS. 20A and 20B. In this case, whether the size of the frame 92 is increased or the frame 92 is divided by a pinch-out operation may be determined according to an input of a user to a screen for user check (may be checked via voice) displayed after the pinch-out operation. Alternatively, whether the size of the frame 92 is increased or the frame 92 is divided by a pinch-out operation may be pre-set by a user.

For instance, as illustrated in FIG. 20A, when a user performs a pinch-out operation on the frame 92b, as illustrated in FIG. 20B, the frame 92b is divided into a frame 92h and a frame 92i.

The layout for the divided frames 92 may be determined by the start position of the pinch-out operation and the operational direction of the pinch-out operation. For instance, in the example of FIGS. 20A and 20B, the start position of the pinch-out operation is an approximately the center of the frame 92b, and the operational direction of the pinch-out operation is from the lower left to the upper right, and so as illustrated in FIG. 12B, the division line of the frame 92b is in a direction from the upper left to the lower right through the center.

Also, the division operation may be a sliding operation on the frame 92 as illustrated in FIGS. 21A and 21B. Also, in this case, whether the frame 92 is deleted or the frame 92 is divided by the sliding operation may be determined by checking a user or may be pre-set by a user.

For instance, as illustrated in FIG. 21A, when a user performs a sliding operation on the frame 92g as illustrated in FIG. 21B, the frame 92g is divided into a frame 92j and a frame 92k.

Alternatively, the layout for the divided frames 92 may be determined by the path of a sliding operation. For instance, as illustrated in FIG. 22A, when the sliding operation is diagonally performed on the frame 92b, the frame 92b may be diagonally divided along the path of the sliding operation into the frame 92h and the frame 92i. Although one frame 92 is divided in the example of FIGS. 22A and 22B, multiple frames 92 may be divided by a single sliding operation by performing the sliding operation along a path through the multiple frames 92.

A case is considered where the images 90 are semantic figures generated by the semantic figure generator 26. When the layout setting part 28 makes a layout change to change the number of semantic figures, the semantic figure generator 26 regenerates a certain number of semantic figures after the layout change so that the meaning represented by a different number of semantic figures before the layout change is represented by the certain number of semantic figures after the layout change. The display controller 30 then displays the certain number of regenerated semantic figures after the layout change.

The semantic figure generator 26 may regenerate semantic figures to be displayed after the layout change based on the entire target data 14. For instance, a case is considered where the entire target data 14 is represented by 12 semantic figures, and a layout change has been made to reduce the number of semantic figures displayed on the 1st screen by three in a layout in which 7 semantic figures (that is, 7 frames) are displayed on the 1st screen and 5 semantic figures are displayed on the 2nd screen. In this case, the semantic figure generator 26 regenerates 9 semantic figures so that the meaning of the entire target data 14 is represented by the 9 semantic figures, which is the total number of the semantic figures after the layout change. The display controller 30 displays the 9 regenerated semantic figures in the layout after the change (specifically, 4 semantic figures on the 1st screen, and 5 semantic figures on the 2nd screen).

Also, the semantic figure generator 26 may regenerate the semantic figures to be displayed after the layout change based on the multiple semantic figures displayed on one screen. For instance, as illustrated in FIG. 16, a case is considered where a layout change has been made to reduce the number of semantic figures displayed on the screen by three in a layout in which 7 semantic figures (that is, 7 frames) are displayed on the screen. In this case, the semantic figure generator 26 regenerates 4 semantic figures 90a to 90d so that the meaning represented by 7 semantic figures displayed on the screen before the layout change is now represented by 4 semantic figures after the layout change. As illustrated in FIG. 17, the display controller 30 then displays the 4 regenerated semantic figures 90a to 90d in the changed layout.

Alternatively, the semantic figure generator 26 may regenerate the semantic figures to be displayed after the layout change based on the categories in the meaning of the target data 14. For instance, a case is considered where multiple semantic figures are generated for each of the categories of the target data 14, and the layout for the purpose as one of the categories is changed from the layout for 7 semantic figures displayed on one screen to the layout for 4 semantic figures displayed on one screen. In this case, the semantic figure generator 26 regenerates 4 semantic figures so that the meaning of the purpose of the target data 14 is represented by 4 semantic figures after the layout change. The display controller 30 then displays the regenerated 4 semantic figures as the semantic figures representing the purpose in the changed layout.

In addition, as illustrated in FIG. 18, when a user performs a superposition operation on the display 18 on which multiple frames 92 (that is, multiple semantic figures) are displayed, the semantic figure generator 26 regenerates a new semantic figure 90g so that the meaning represented by two semantic figures 90e and 90f as the target of the superposition operation is represented by the one semantic figure. As illustrated in FIG. 19, the display controller 30 may display the regenerated one semantic figure 90g in the changed layout. For instance, when the semantic figure 90e represents the contents of the dynamic image of the target data 14 from 0:00 to 1:00, and the semantic figure 90f represents the contents of the dynamic image from 1:01 to 2:00, the semantic figure 90g represents the contents of the dynamic image from 0:00 to 2:00.

Although each of the exemplary embodiments above has been described using an example in which a layout change is made to reduce the number of semantic figures, it goes without saying that even when a layout change is made to increase the number of semantic figures, the semantic figure generator 26 may regenerate a certain number of semantic figures after the layout change so that the meaning represented by a less number of semantic figures before the layout change is represented by the certain number of semantic figures after the layout change.

Also, when the layout setting part 28 makes a layout change to change the number of semantic figures, the semantic figure generator 26 may generate a new semantic figure based on the range of the target data 14 based on which semantic figures as the target of an instruction for the layout change are generated. The display controller 30 may display a certain number of regenerated semantic figures after the layout change.

A case is considered where multiple parts of the target data 14, based on which multiple semantic figures as the target of a superposition operation are generated, are not consecutive in time series. For instance, in the example of FIG. 18, the semantic figure 90e represents the contents of the target data 14 from 0:00 to 1:00, the semantic figure 90f represents the contents of the target data 14 from 5:00 to 8:00, and the semantic figure 90e and the semantic figure 90f are the target of a superposition operation.

In such a case, the semantic figure generator 26 generates a new semantic figure that represents multiple parts of the target data 14 based on which multiple semantic figures as the target of a superposition operation are generated, and the display controller 30 displays the new semantic figure in the changed layout. For instance, in the above-described example, one semantic figure 90g is generated and displayed, the semantic figure 90g representing the contents of the target data 14 from 0:00 to 1:00, based on which the semantic figure 90e is generated, and the contents of the target data 14 from 5:00 to 8:00, based on which the semantic figure 90f is generated.

Also, the semantic figure generator 26 may generate a new semantic figure that represents a consecutive part including multiple parts of the target data 14 based on which multiple semantic figures as the target of a superposition operation are generated, and parts located between the multiple parts in time series in the target data 14. For instance, in the above-described example, a semantic figure 90g may be generated and displayed, the semantic figure 90g representing the contents of the target data 14 from 0:00 to 8:00, which provide a consecutive part in time series including the contents of the target data 14 from 0:00 to 1:00, based on which the semantic figure 90e is generated, and the contents of the target data 14 from 5:00 to 8:00, based on which the semantic figure 90f is generated.

A case is considered where one of the semantic figures is deleted by a sliding operation or the like. For instance, in the example of FIG. 16, the semantic figure of the frame 92c represents the contents of the target data from 3:00 to 4:00, the semantic figure of the frame 92a represents the contents of the target data from 8:00 to 9:00, the semantic figure of the frame 92b represents the contents of the target data from 14:00 to 15:00, and the frames 92a, 92b, and 92c are a target of deletion.

In such a case, the semantic figure generator 26 regenerates the semantic figures 90a to 90d by adding the contents of the target data 14 from 3:00 to 4:00, based on which the semantic figure of the frame 92c is generated, the contents of the target data 14 from 8:00 to 9:00, based on which the semantic figure of the frame 92a is generated, and the contents of the target data 14 from 14:00 to 15:00, based on which the semantic figure of the frame 92b is generated to the target data 14 based on which the remaining semantic figures (the semantic figures 90a to 90d of FIG. 17) after the layout change are generated. Also, the semantic figure generator 26 may regenerate the semantic figures 90a to 90d by adding the contents of the target data 14 from 3:00 to 15:00, which provide a consecutive part including the target data 14 based on which the semantic figures of the frames 92a to 92c are generated to the target data 14 based on which the remaining semantic figures 90a to 90d after the layout change are generated.

A case is considered where a semantic figure is divided into multiple semantic figures by a division operation. In this case, the semantic figure generator 26 generates semantic figures of multiple frames after the division to indicate the contents represented by the semantic figure of the frame 92 before the division.

When the semantic figure of the frame 92 before the division includes multiple components and a component is designated by a user and a division operation is performed on the component, the semantic figure generator 26 regenerates a semantic figure representing the contents (of the target data 14) indicated by the designated component, and semantic figures representing the contents indicated by other components, and the display controller 30 may display the regenerated multiple semantic figures on multiple frames 92 after the division.

For instance, in FIG. 21A, when a user performs a sliding operation on the frame 92g of the semantic figure 90g including two components of a male and a smartphone by using the component of the smartphone as a start point (in short, by designating the component of the smartphone), as illustrated in FIG. 21B, a semantic figure 90k is regenerated and displayed in the frame 92k after the division, the semantic figure 90k representing the contents indicated by the component of the smartphone designated by a user. A semantic figure 90j is regenerated and displayed in the frame 92j after the division, the semantic figure 90j representing the contents indicated by the component of the male not designated by a user.

Here, the sizes of the frames 92j and 92k after the division may be determined based on the amount of the contents indicated by the component (smartphone) designated by a user, and the amount of the contents indicated by the component (male) not designated by a user in the contents represented by the semantic figure 90g of the frame 92g before the division. For instance, in the contents represented by the semantic figure 90g, when the amount of the contents regarding a male is three times the amount of the contents regarding a smartphone, the size of the frame 92j may be three times the size of the frame 92k.

Also, when receiving a division operation to designate a division line of the frame 92 by a sliding operation or a pinch-out operation, the semantic figure generator 26 may regenerate a semantic figure representing the contents indicated by a component located in one of areas divided by the division line in the frame 92 before the division, and a semantic figure representing the contents indicated by a component located in the other area, and the display controller 30 may display the regenerated multiple semantic figures on multiple frames 92 after the division.

For instance, in FIG. 22A, when a user performs a division operation to designate a division line on the frame 92g of the semantic figure 90g including two components of Euro and Yen so as to include the component of Euro in one of areas and the component of Yen in the other area, as illustrated in FIG. 22B, a semantic figure 90h representing the contents indicated by the component of Yen is regenerated and displayed in the frame 92h after the division, and a semantic figure 90i representing the contents indicated by the component of Euro is regenerated and displayed in the frame 92j after the division.

As described above, according to the third exemplary embodiment, a user can designate a layout for the images 90 which represent the target data 14. Therefore, a user can display the images 90 in a desired layout.

Although the exemplary embodiments according to the invention have been described above, the invention is not limited to the above-described exemplary embodiments, the exemplary embodiments may be combined and utilized, and various modifications may be made without departing from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a processor programmed to:
      receive via an interface a user input specifying a layout of a plurality of figures, the plurality of figures representing a meaning of a portion of target data, the portion being determined by analyzing the target data to obtain a meaning of the target data; and
      display the plurality of figures on a display according to the layout specified in the received user input,
   wherein:
      the meaning of the target data, which is obtained by analyzing the target data, is divided into a plurality of categories,
      the display is partitioned into a plurality of different screens, with each screen displaying one of the plurality of categories,
      the user input specifies the layout including a number of the plurality of figures per screen, for each one of the displayed plurality of categories, and
      the displaying of the plurality of figures includes a graphic representing a character string included in the portion of the target data, with the proviso that the graphic is retrieved from a memory and is not included in the portion of the target data, and the graphic non-textually represents a character string included in the portion of the target data.

2. The information processing device according to claim 1, wherein the layout further includes at least one of a number of screens, positions, sizes, and arrangement of the plurality of figures.

3. The information processing device according to claim 1, wherein the processor is programmed to
display a setting screen on the display for receiving the user input specifying the layout for each one of the plurality of categories.

4. The information processing device according to claim 2, wherein the processor is programmed to
display a setting screen on the display for receiving the user input specifying the layout for each one of the plurality of categories.

5. The information processing device according to claim 1, wherein
the interface receives a user input changing the layout of the plurality of figures on the display on which the plurality of figures are displayed.

6. The information processing device according to claim 2, wherein
the interface receives a user input changing the layout of the plurality of figures on the display on which the plurality of figures are displayed.

7. The information processing device according to claim 5, wherein the processor is programmed to
when the user input changing the layout of the plurality of figures is a sliding operation on the display, delete one or more of the plurality of figures located on an imaginary line from a start point of the sliding operation in a sliding direction of the sliding operation.

8. The information processing device according to claim 6, wherein the processor is programmed to
when the user input changing the layout of the plurality of figures is a sliding operation on the display, delete one or more of the plurality of figures located on an imaginary line from a start point of the sliding operation in a sliding direction of the sliding operation.

9. The information processing device according to claim 5, wherein
the processor is programmed to
when the user input changing the layout of the plurality of figures is an operation to superimpose the plurality of figures on one another, generate and display one figure in an area where the plurality of figures are to be superimposed on one another.

10. The information processing device according to claim 6, wherein
the processor is programmed to
when the user input changing the layout of the plurality of figures is an operation to superimpose the plurality of figures on one another, generate and display one figure in an area where the plurality of figures are to be superimposed on one another.

11. The information processing device according to claim 1, wherein the processor is programmed to:
receive an instruction to change a number of the plurality of figures; and
re-generate and display figures based on the changed number, with the proviso that the re-generated figures represent meaning represented with the number of the plurality of figures before the change.

12. The information processing device according to claim 11, wherein the processor is programmed to
re-generate new figures based on a range of the target data whose meaning is represented with the number of the plurality of figures before the change.

13. A non-transitory computer readable medium storing an information processing program causing a computer to execute a process, the process comprising:
receiving a user input specifying a layout of a plurality of figures, the plurality of figures representing a meaning of a portion of target data, the portion being determined by analyzing the target data to obtain a meaning of the target data; and
displaying the plurality of figures on a display according to the layout specified in the received user input,
wherein:
the meaning of the target data, which is obtained by analyzing the target data, is divided into a plurality of categories, and
the display is partitioned into a plurality of different screens, with each screen displaying one of the plurality of categories,
the user input specifies the layout including a number of the plurality of figures per screen, for each one of the displayed plurality of categories, and
the displaying of the plurality of figures includes a graphic representing a character string included in the portion of the target data, with the proviso that the graphic is retrieved from a memory and is not included in the portion of the target data, and the graphic non-textually represents a character string included in the portion of the target data.

* * * * *